United States Patent
Pollmann et al.

(10) Patent No.: US 12,420,411 B2
(45) Date of Patent: *Sep. 23, 2025

(54) DEVICE FOR THE AUTOMATED ESTABLISHMENT OF A PLUG-IN CONNECTION

(71) Applicant: Liebherr-Verzahntechnik GmbH, Kempten (DE)

(72) Inventors: Jan Pollmann, Kempten (DE); Lukas Hiemer, Altusried (DE)

(73) Assignee: LIEBHERR-VERZAHNTECHNIK GMBH, Kempten (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,680

(22) Filed: Sep. 23, 2021

(65) Prior Publication Data
US 2022/0088781 A1    Mar. 24, 2022

(30) Foreign Application Priority Data
Sep. 23, 2020 (EP) ................................. 20197837

(51) Int. Cl.
*B25J 9/16* (2006.01)
*B25J 9/12* (2006.01)
*H01R 43/26* (2006.01)

(52) U.S. Cl.
CPC ............. *B25J 9/1664* (2013.01); *B25J 9/123* (2013.01); *H01R 43/26* (2013.01)

(58) Field of Classification Search
CPC .............. B25J 15/0061; B25J 15/0253; B25J 17/0208; B25J 19/023; B25J 9/0087; B25J 9/0093; B25J 9/026
See application file for complete search history.

(56) References Cited

U.S. PATENT DOCUMENTS

| | | | | |
|---|---|---|---|---|
| 4,423,998 A | * | 1/1984 | Inaba | B25J 19/025 414/730 |
| 4,472,668 A | * | 9/1984 | Mutschler | B25J 15/02 414/730 |
| 4,527,326 A | * | 7/1985 | Kohno | G06T 1/0014 29/709 |
| RE33,466 E | * | 12/1990 | Kato | B25J 9/1687 29/709 |

(Continued)

FOREIGN PATENT DOCUMENTS

| | | |
|---|---|---|
| CN | 210517600 U | 5/2020 |
| DE | 102017217601 A1 | 4/2019 |

(Continued)

*Primary Examiner* — Minh N Trinh
(74) *Attorney, Agent, or Firm* — McCoy Russell LLP

(57) ABSTRACT

The present disclosure shows a device for the automated establishment of a plug-in connection of a plug arranged at a cable to a plug mating element, such as for cabling battery modules, and in the manufacture of vehicles having hybrid and/or electric drives, comprising: a gripper for gripping the plug, a handling unit having a plurality of axes for moving the gripper, with it being a multi-axis robot and/or a surface portal, and a control for controlling the gripper and the handling unit. Provision is made in this process that the gripper comprises a plug-in actuator for moving the plug into a plugged-in position with the plug mating element.

14 Claims, 15 Drawing Sheets

(56) References Cited

U.S. PATENT DOCUMENTS

| | | | |
|---|---|---|---|
| 4,985,486 A * | 1/1991 | Westeppe | C08L 25/14 |
| | | | 524/451 |
| 4,985,846 A * | 1/1991 | Fallon | B25J 9/1697 |
| | | | 382/153 |
| 6,195,884 B1 | 3/2001 | Miyamoto et al. | |
| 8,424,182 B2 * | 4/2013 | Sato | B25J 9/1687 |
| | | | 29/407.01 |
| 11,124,321 B2 * | 9/2021 | Iwasaki | B65B 7/28 |
| 2012/0205929 A1 * | 8/2012 | Sdahl | B25J 15/0253 |
| | | | 294/196 |
| 2014/0251056 A1 * | 9/2014 | Preuss | B25J 9/042 |
| | | | 29/428 |
| 2015/0210174 A1 | 7/2015 | Settele | |
| 2020/0122342 A1 | 4/2020 | Mukou | |
| 2020/0262056 A1 * | 8/2020 | Riegger | B25J 9/046 |
| 2020/0290206 A1 | 9/2020 | Mukou et al. | |
| 2022/0088785 A1 * | 3/2022 | Pollmann | B25J 9/1682 |

FOREIGN PATENT DOCUMENTS

| | | |
|---|---|---|
| EP | 3680074 A1 | 7/2020 |
| JP | H0482689 A | 3/1992 |
| JP | H06188061 A | 7/1994 |
| JP | 2000228267 A | 8/2000 |
| JP | 2015220068 A | 12/2015 |
| WO | 2017198281 A1 | 11/2017 |

* cited by examiner

Fig. 6a
Fig. 6b
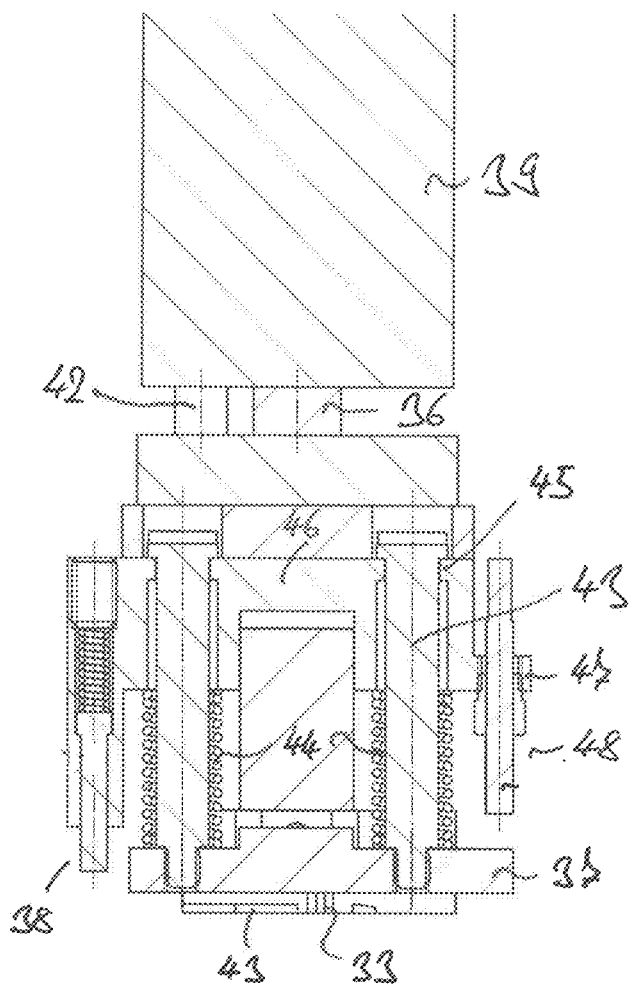
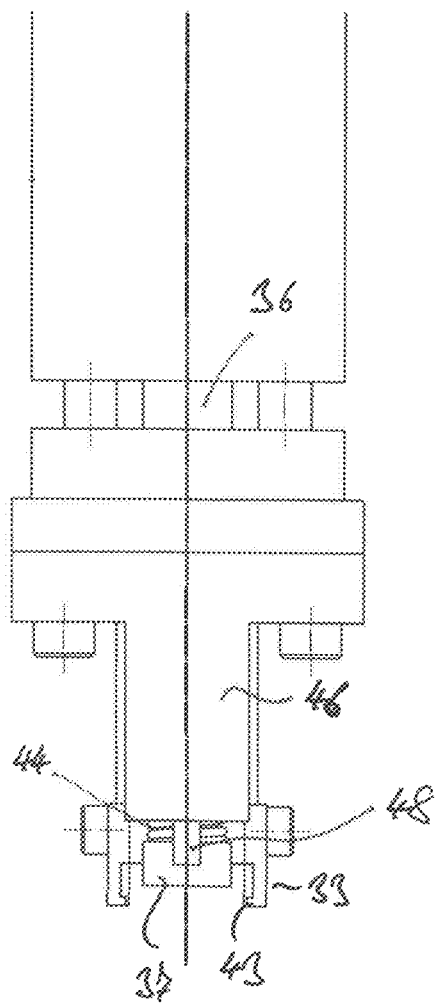

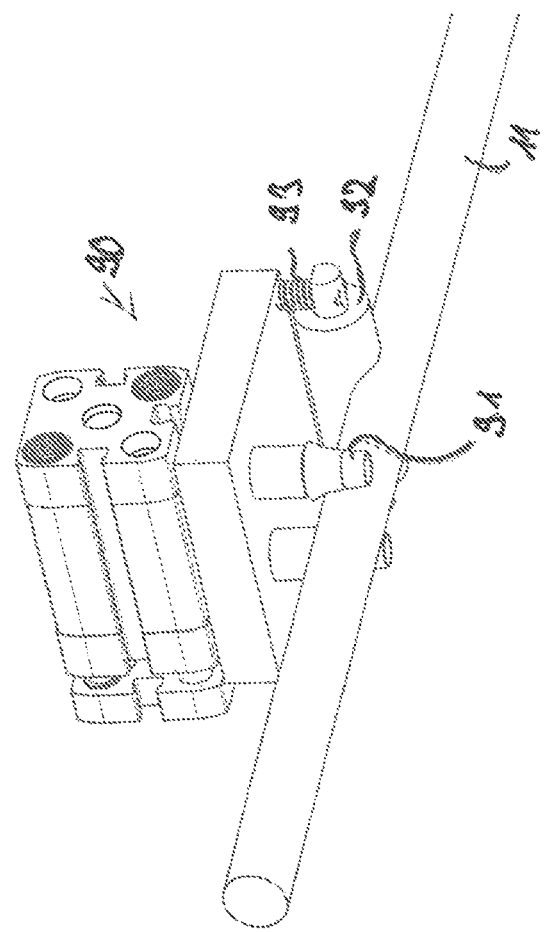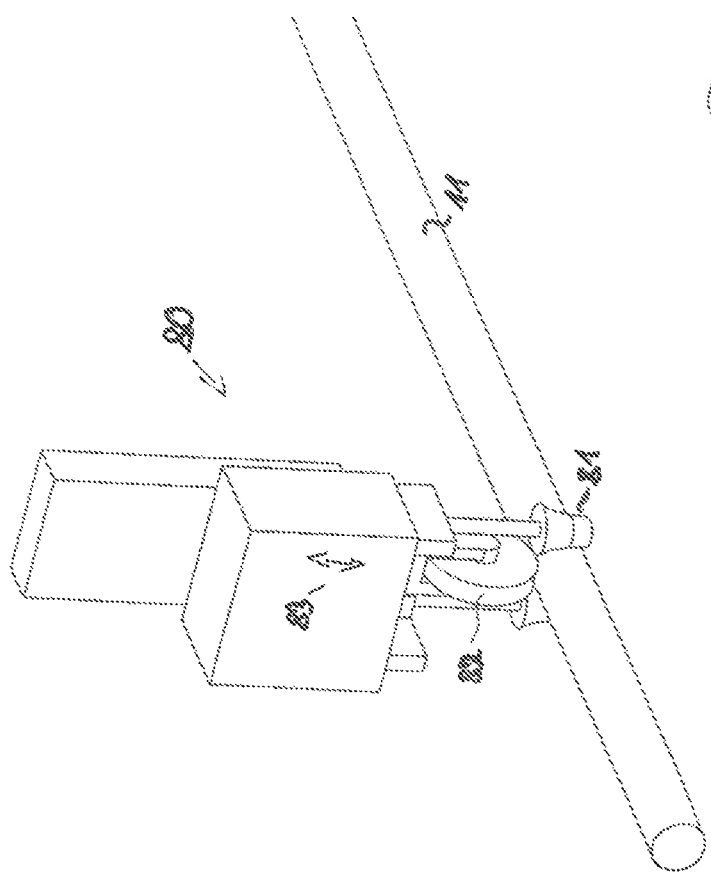

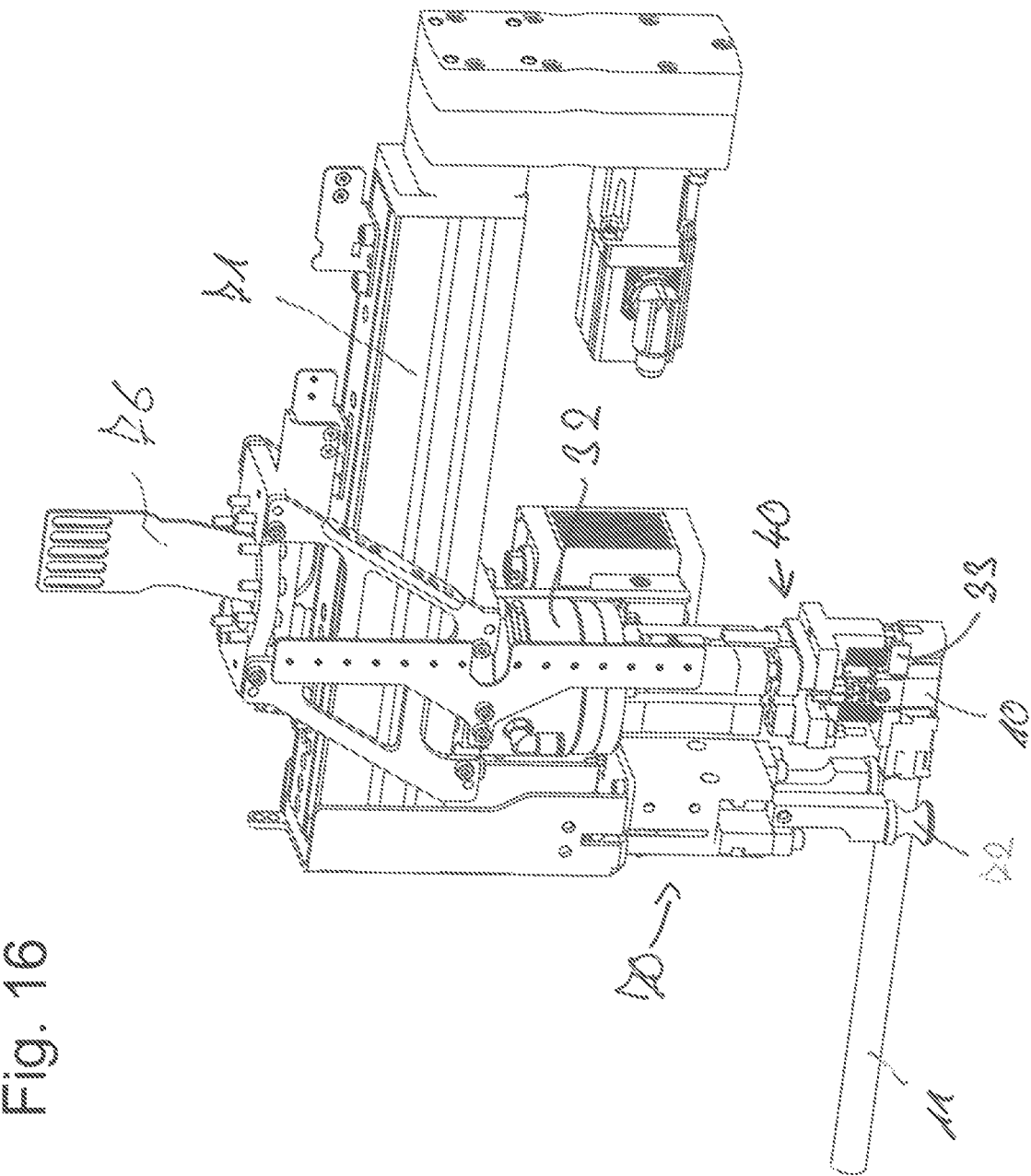

DEVICE FOR THE AUTOMATED ESTABLISHMENT OF A PLUG-IN CONNECTION

CROSS REFERENCE TO RELATED APPLICATIONS

The present application claims priority to European Patent Application No. 20 197 837.6 filed on Sep. 23, 2020. The entire contents of the above-listed application is hereby incorporated by reference for all purposes.

TECHNICAL FIELD

The present disclosure relates to a device for the automated establishment of a plug-in connection of a plug arranged at a cable to a plug mating element and to a gripper that can be used in such a device.

BACKGROUND AND SUMMARY

Document DE 10 2017 217601 A1 shows a method of plugging in an electric plug by means of a gripper arranged at a robot. In this process, the plug is first moved to the socket so that it contacts it mechanically and determines the correct plug-in position by a search movement of the plug in a search plane transverse to the plug-in direction. However, due to the mechanical strain of the plug and socket, this solution is only possible at all for specific plugs and sockets. It is additionally time-consuming and complex.

A charging station for charging electrically operated automobiles is known from document US 2015/0210174 A1 in which the plug of the charge cable is automatically connected to the charge socket by means of a robot.

It is the object of the present disclosure to provide an improved device for the automated establishment of a plug-in connection of a plug arranged at a cable to a plug mating element.

This object is achieved by a device as described herein.

The present disclosure comprises in a first aspect a device for the automated establishment of a plug-in connection of a plug arranged at a cable to a plug mating element comprising a gripper for gripping the plug, a handling unit having a plurality of axes for moving the gripper, and a control for controlling the gripper and the handling unit. Provision is made in this process that the gripper comprises a plug-in actuator for moving the plug into a plugged-in position with the plug mating element.

The plug-in actuator permits a simpler and more reliable joining of the plug-in connection than would be possible by the handling unit alone.

In some embodiments, the handling unit may be a multi-axis robot and/or a surface portal.

The device in accordance with the disclosure may be a device for the automated cabling of battery modules, such as in the manufacture of vehicles having hybrid and/or electric drives.

The control of the device in accordance with the disclosure can be programmed such that the methods described in the following for the establishment of a plug-in connection of a plug to a plug mating element are carried out in an automated manner. To the extent that how the handling unit and/or the gripper is/are used is described in the following, this always takes place—unless otherwise stated—by a corresponding control by the control that is correspondingly programmed for this purpose.

In a possible embodiment of the present disclosure, the plug-in actuator is a linear actuator. It can, for example, be a pneumatic cylinder and/or an electromechanical linear drive.

The gripper can, for example, be a mechanical, pneumatic, and/or magnetic gripper.

In a possible embodiment of the present disclosure, the gripper is a vacuum gripper and/or an adaptive shape gripper.

In a possible embodiment of the present disclosure, the gripper is a mechanical gripper for gripping the plug.

In some embodiments, the gripper comprises at least two mechanical elements, for instance gripping jaws and/or gripping fingers, that are movable relative to one another via an actuator.

The axis of movement of the plug-in actuator may be perpendicular to the axis of movement of the gripping elements.

In a possible embodiment of the present disclosure, the plug-in actuator moves the plug via a pushing element to move into the final plug-in position.

The pushing element can be the gripping elements of the gripper in a possible embodiment of the present disclosure.

In an embodiment, the pushing element is, however, an element separate from the gripping elements.

In a possible embodiment of the present disclosure, the pushing element presses onto an upper side of the plug.

In a possible embodiment of the present disclosure, the pushing element is arranged above a reception region for the plug provided between the gripping elements.

In a possible embodiment of the present disclosure, the control is designed such that it controls the gripper such that it loosens or releases the grip of the gripper before the plug-in actuator moves the plug into the final plug-in position by means of the pushing element.

The grip of the gripper can be loosened or released in this process before the pushing element moves the plug or at least before the plug has been moved into the final plugged in position.

It is hereby avoided that strains are transmitted from the gripper to the plug-in connection.

The control is designed in a possible embodiment of the present disclosure such that it controls the handling unit to move the plug into an engagement position with the plug mating element and controls the plug-in actuator to move the plug into a final plug-in position with the plug mating element with a stationary handling unit.

The present disclosure comprises in a second aspect a device for the automated establishment of a plug-in connection of a plug arranged at a cable to a plug mating element comprising a gripper for gripping the plug, a handling unit having a plurality of axes for moving the gripper, and a control for controlling the gripper and the handling unit. Provision is made in this process that the gripper is arranged at the handling unit via a compensation element, with the compensation element permitting a compensation movement of the gripper with respect to the handling unit in at least one operating mode.

The compensation unit prevents the transmission of strains from the handling unit to the gripper and thus to the plug-in connection. The compensation unit can furthermore also facilitate the centering of the gripper with respect to the plug mating element depending on the design of the gripper.

In a possible embodiment of the present disclosure, the compensation unit comprises one or more springs against whose preload the gripper can be laterally and/or axially deflected.

In a possible embodiment of the present disclosure, the compensation unit can be switched from a first operating mode in which the compensation unit permits a compensation movement of the gripper with respect to the handling unit into a second operating mode in which the gripper is rigidly arranged at the handling unit.

The possible embodiments of the present disclosure described above with respect to the first aspect also apply in the same manner to a device in accordance with the second aspect.

Both aspects can here also be used independently of one another. A plug-in actuator may also be used with a gripper that is rigidly connected to an end member of the handling unit and a compensation unit with a gripper without a plug-in actuator in which the plug-in connection is therefore exclusively established via the handling unit.

In an embodiment, however, both aspects are used in combination, i.e. the gripper is arranged at the end member of the handling unit via a compensation unit and comprises a plug-in actuator.

The plug-in actuator here may be arranged at a base body of the gripper that is connected to the end member of the handling unit via the compensation unit.

The present disclosure comprises in a third aspect a device for the automated establishment of a plug-in connection of a plug arranged at a cable to a plug mating element comprising a gripper for gripping the plug, a handling unit having a plurality of axes for moving the gripper, and a control for controlling the gripper and the handling unit. Provision is made in this process that the gripper comprises a latching device for latching a latching element of the plug and/or of the plug mating element.

In a possible embodiment of the present disclosure, the latching device comprises a contact element for contacting the latching element in a plugged-in position of the plug.

In certain embodiments, the gripper furthermore comprises an actuator for moving the contact element relative to the plug.

The possible embodiments of the present disclosure described above with respect to the first and second aspects also apply in the same manner to a device in accordance with the third aspect.

The third aspect can also be used independently of the first and second aspects. A latching device may also be used with a gripper that is rigidly connected to an end member of the handling unit and does not comprise a plug-in actuator in which the plug-in connection is therefore exclusively established via the handling unit.

In an embodiment, the third aspect is, however, used in combination with the first and/or second aspect(s), i.e. the gripper has a latching device and is arranged at the end member of the handling unit via a compensation unit and/or comprises a plug-in actuator.

In a possible embodiment of the present disclosure, the plug-in actuator is used to move the contact element relative to the plug.

In an embodiment, the pushing element for moving the plug is connected to the plug-in actuator in a movable, and further in a resilient manner and therefore permits a further movement of the plug-in actuator, by which the contact element is moved toward the latching element, after the moving of the plug into the plugged-in position. The pushing element may be arranged at the plug-in actuator preloaded in the plug-in direction and/or may be arranged at a base element of the gripper moved by the plug-in actuator.

The contact element can be movably connected to the plug-in actuator and may be preloaded in the plug-in direction via a spring. The spring thus transmits the force for latching the latching element onto the contact element.

In a possible embodiment of the present disclosure, the end position of the plug-in actuator is recognized via a sensor. The movement of the plug-in actuator can be stopped as soon as the end position has been reached in which the latching element has been latched.

In an alternative embodiment, the gripper can have an additional actuator for moving the contact element.

In a possible embodiment of the present disclosure, the end position of the actuator that is used for moving the contact element is recognized via a sensor. The movement of the actuator may be stopped as soon as the end position has been reached in which the latching element has been latched.

The present disclosure comprises in a fourth aspect a device for the automated establishment of a plug-in connection of a plug arranged at a cable to a plug mating element comprising a gripper for gripping the plug, a handling unit having a plurality of axes for moving the gripper, and a control for controlling the gripper and the handling unit. Provision is made in this process that the gripper has at least one alignment element that is brought into contact with the plug mating element to align the plug with the plug mating element.

The gripper can hereby be mechanically centered with respect to the plug mating element. Unlike in the prior art, this does not, however, take place by a contact between the plug and the plug mating element, but rather by a contact between the alignment element of the gripper and the plug mating element.

In a possible embodiment of the present disclosure, the device is designed such that the alignment element comes into contact with a side surface of the plug-mating element.

In a possible embodiment of the present disclosure, the alignment element and the plug held by means of the gripping element are movable relative to one another by means of an actuator of the gripper to align the plug with the plug mating element. The alignment therefore does not take place or at least does not exclusively take place via a movement of the handling unit.

In a possible embodiment of the present disclosure, the gripper comprises at least two alignment elements that encompass the plug mating element at oppositely disposed sides and are travelable toward one another via the at least one actuator to align the plug with respect to the plug mating element.

In a possible embodiment of the present disclosure, the alignment elements grip the plug mating element.

In a possible embodiment of the present disclosure, the alignment of the plug takes place by aligning the gripper.

In a possible embodiment of the present disclosure, the control is designed such that the plug is brought into an engagement position with the plug mating element while the at least one alignment element is in contact with the plug mating element and the alignment elements may grip the plug mating element. In certain embodiments, the movement of the plug into the final plug-in position also takes place while the at least one alignment element is in contact with the plug mating element and the alignment elements can grip the plug mating element.

In a possible embodiment of the present disclosure, the alignment element is arranged at the gripper movable by an actuator and moves the former relative to the handling unit.

The possible embodiments of the present disclosure described above with respect to the first to third aspects also apply in the same manner to a device in accordance with the fourth aspect.

The fourth aspect can also be used independently of the first to third aspects. An alignment element may also be used with a gripper that is rigidly connected to an end member of the handling unit and does not comprise any plug-in actuator and/or any latching device.

In an embodiment, the fourth aspect is, however, used in combination with one or more or all of the previously described aspects.

The fourth aspect may be combined with the first and/or second aspect(s), i.e. the gripper has an alignment element and is arranged at the end member of the handling unit via a compensation unit and/or comprises a plug-in actuator.

In an embodiment, the alignment element is arranged at the gripper movable by an actuator and moves the former relative to the handling unit, with this movement being made possible by the compensation element that is arranged between he gripper and the handling unit and that is deflected by the alignment element to align the gripper.

The present disclosure comprises in a fifth aspect a device for the automated establishment of a plug-in connection of a plug arranged at a cable to a plug mating element comprising a gripper for gripping the plug, a handling unit having a plurality of axes for moving the gripper, and a control for controlling the gripper and the handling unit. Provision is made in this process that the device comprises a camera for detecting the position of the plug mating element, with the control being designed such that the plug received at the gripper can be traveled to a plug-in position in front of the plug mating element on the basis of the detected position.

In a possible embodiment of the present disclosure, the camera is arranged at the gripper, with the control being designed such that the camera is first traveled into a measurement position in front of the plug mating element to detect the position of the plug mating element and the plug received at the gripper is thereupon traveled into the plug-in position by repositioning the gripper.

In a possible embodiment of the present disclosure, the alignment of the plug with respect to the plug mating element takes place exclusively via the control of the position of the gripper on the basis of the position of the plug mating element detected by the camera, i.e. without an additional mechanical alignment at the plug mating element.

In a possible embodiment of the present disclosure, the position detection is used to determine an offset between an actual position and an intended position of the plug mating element and to correspondingly correct the position of the gripper for plugging the plug.

The possible embodiments of the present disclosure described above with respect to the first to fourth aspects also apply in the same manner to a device in accordance with the fifth aspect.

The device in accordance with the disclosure in accordance with the fifth aspect may represent a device for the automated cabling of battery modules, such as in the manufacture of vehicles having hybrid and/or electric drives.

The fifth aspect can also be used independently of the first to fourth aspects. The camera may also be used with a gripper that is rigidly connected to an end member of the handling unit and does not comprise any plug-in actuator and/or any latching device. An alignment device is furthermore typically no longer required on the use of a camera.

In a possible embodiment, the fifth aspect is, however, used in combination with one or more or all of the previously described aspects.

The fifth aspect may be combined with the first and/or second aspect(s), i.e. the device has a camera and the gripper is arranged at the end member of the handling unit via a compensation unit and/or comprises a plug-in actuator.

In a possible embodiment of the present disclosure, the detection of the position of the plug mating element and/or the traveling of the plug into the plug-in position takes place by a rigidly connected compensation element and the movement of the plug into the plugged position takes place by means of the plug-in actuator with a flexibly connected compensation unit.

The present disclosure furthermore comprises the grippers for the devices such as were described above.

In this respect, the present disclosure relates to a gripper having at least one gripping element for gripping a plug arranged at a cable, with the gripper being usable for joining a plug-in connection to a plug mating element and with the gripper comprising a plug-in actuator and/or a compensation device and/or a latching device and/or an alignment element and/or a camera. The gripper can be designed here as has already been described above.

The present disclosure further comprises a method for the automated establishment of a plug-in connection of a plug arranged at a cable to a plug mating element having one of the devices such as have been described above.

In accordance with the first aspect, the plug is moved into a plugged-in position with the plug mating element by the plug actuator.

In accordance with the second aspect, the gripper is deflected with respect to the end member of the handling unit in at least one operating mode.

In accordance with the third aspect, a latching element of the plug and/or of the plug mating element is latched by the latching device of the gripper.

In accordance with the fourth aspect, the plug is mechanically aligned with respect to the plug mating element by the alignment element.

In accordance with the fifth aspect he position of the plug mating element is detected by the camera.

In an embodiment, the methods take place as was already described above with regard to the device.

The methods may be used for the cabling of battery modules, such as in the manufacture of vehicles having hybrid and/or electric drives,.

Cables that serve as module connectors for connecting battery modules can hereby be installed.

BRIEF DESCRIPTION OF THE FIGURES

The present disclosure will now be described in more detail with reference to embodiments and to drawings.

There are shown:

FIGS. 6a a sectional view and a front view of the second embodiment shown in. and 6b:. FIGS. 4 and 5;

FIG. 14: a fourth embodiment of a gripper in accordance with the disclosure;

FIG. 15: a fifth embodiment of a gripper in accordance with the disclosure; and

FIG. 16: an alternative third embodiment of a gripper in accordance with the disclosure such as is used in the embodiment in accordance with FIGS. 10 and 11 of the device.

DETAILED DESCRIPTION

Embodiments of the present disclosure that implement a plurality of aspects of the disclosure in combination in part will be described in more detail in the following. The aspects shown in combination in the embodiments can, however, also each be used per se in accordance with the disclosure.

Figure 1:
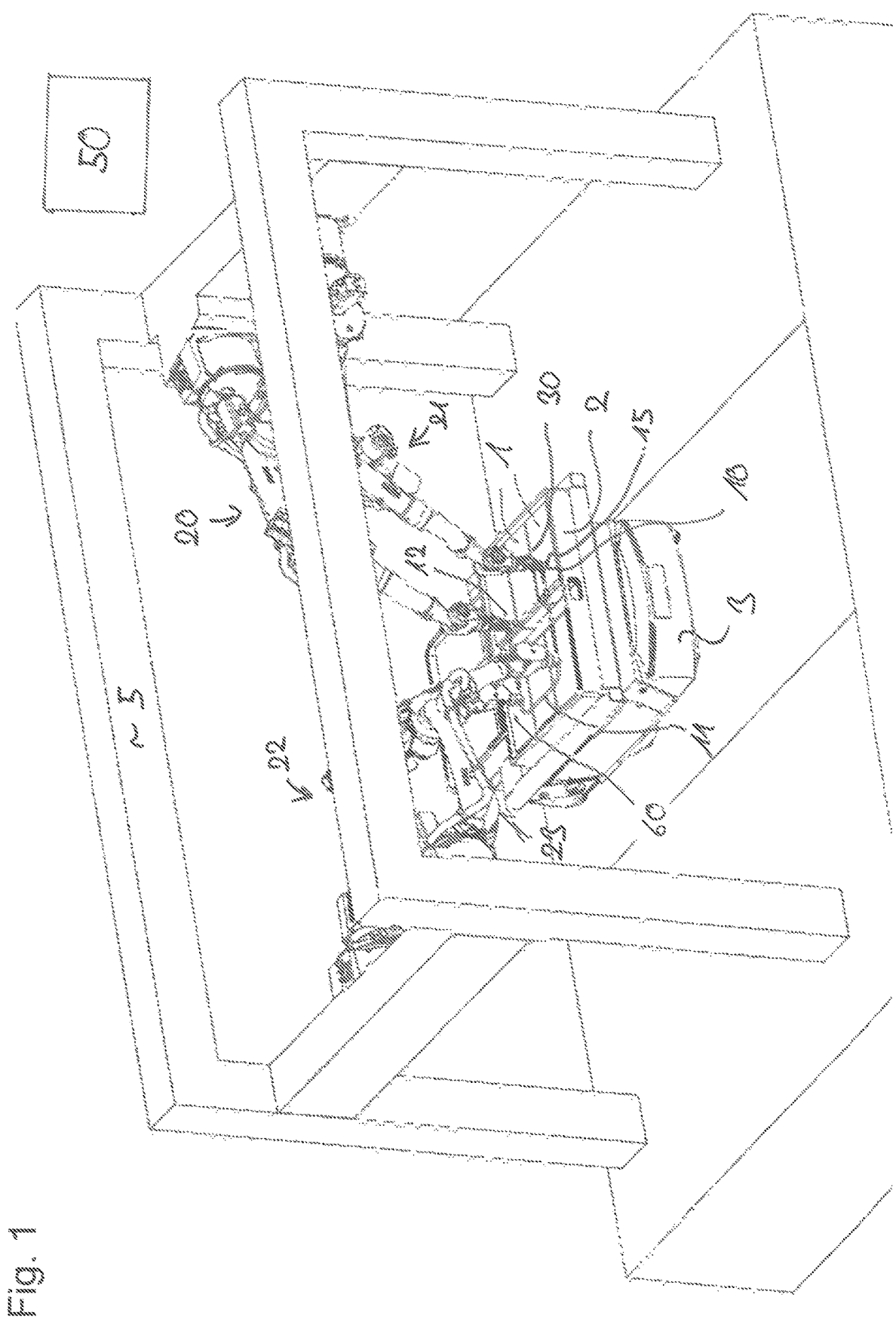
FIG. 1: a first embodiment of a device in accordance with the disclosure for the automated establishment of a plug-in connection.

FIG. 1 shows a first embodiment of a device in accordance with the disclosure for the automated establishment of a plug-in connection of a plug 10 to a plug mating element 15.

The embodiment of the device shown in FIG. 1 is used for cabling battery modules 1, such as in the manufacture of vehicles having hybrid and/or electric drives. In this respect, a plurality of battery modules are typically installed at a support structure 2 and each have plug mating elements, for example in the form of plug strips or plug sockets via which the battery modules are connected to one another and/or to a control. The support device 2 can, for example, be a part of the chassis of the corresponding vehicle or of a support arrangement that is installed at such a chassis.

The cabling of such battery modules has previously been done manually since no devices for the automated establishment of the plug-in connections were available. The present disclosure now offers such a device via which the plug-in connections can be established in an automated manner, for instance with battery modules.

In some embodiments, the use of the present disclosure takes place as part of the manufacture of vehicles having hybrid and/or electric drives. The support devices 2 at which the modules 1 are installed can here be transported to the device in accordance with the disclosure via a transport arrangement 3 to establish the plug-in connections. The device in accordance with the disclosure can here be part of a production line for manufacturing automobiles.

The device in accordance with the disclosure can here be used in a possible application for the installation of cables at whose two ends a respective plug is arranged that is connected to a plug mating element by the device in accordance with the disclosure.

In alternative embodiments, one end of the cable could, however, also already be electrically connected.

In a possible embodiment, the device in accordance with the disclosure is designed and its control may be programmed such that a plurality of cables are successively installed at the battery unit of the same vehicle by the device. Cables of different lengths and/or having a different extent of the cable can be installed in this process.

In possible embodiments of the present disclosure, a plurality of devices in accordance with the disclosure can be arranged after one another in a production line, with a first device installing shorter cables than a second device in a possible embodiment.

The above-described use for cabling battery modules is not only possible in the first embodiment of a device in accordance with the disclosure shown in FIG. 1. All the embodiments of the present disclosure can rather be configured and used for this application purpose. The devices in accordance with the disclosure can, however, also be used in different sectors of industrial production, for instance as part of a production line, to make electrical connections by the establishing of plug-in connections.

The devices in accordance with the disclosure here have, as shown in FIG. 1, in each case at least one gripper 30 for gripping the plug 10, a handling unit 20-23 having a plurality of axes for moving the at least one gripper 30, and a control 50 for controlling the gripper 30 and the handling unit 20-23.

In the embodiment shown in FIG. 1, the handling unit used is in each case a multi-axis robot having a plurality of rotational axes, such as a six-axis industrial robot. In alternative embodiments that will likewise still be described in the following, surface portals having a plurality of linear axles can also be used instead of or in addition to such a multi-axis robot. The handling units 20-23 can be arranged at a support structure 5 as shown in FIG. 1.

The control 50 of the device in accordance with the disclosure is respectively programmed such that the methods described within the framework of the present application for the establishment of a plug-in connection of a plug to a plug mating element are carried out in an automated manner. In certain embodiments, the total installation of the cables and plugs takes place in an automated manner.

The control that is only shown schematically in FIG. 1, can have a microprocessor and a program code stored in a memory for this purpose, with the program code controlling the handling unit and the gripper accordingly if it runs on the microprocessor. To the extent that how the handling unit and/or the gripper is/are used is described within the framework of the present application, this is always done—unless otherwise stated—by a corresponding control by the control 50 that is correspondingly programmed for this purpose.

Figure 2:
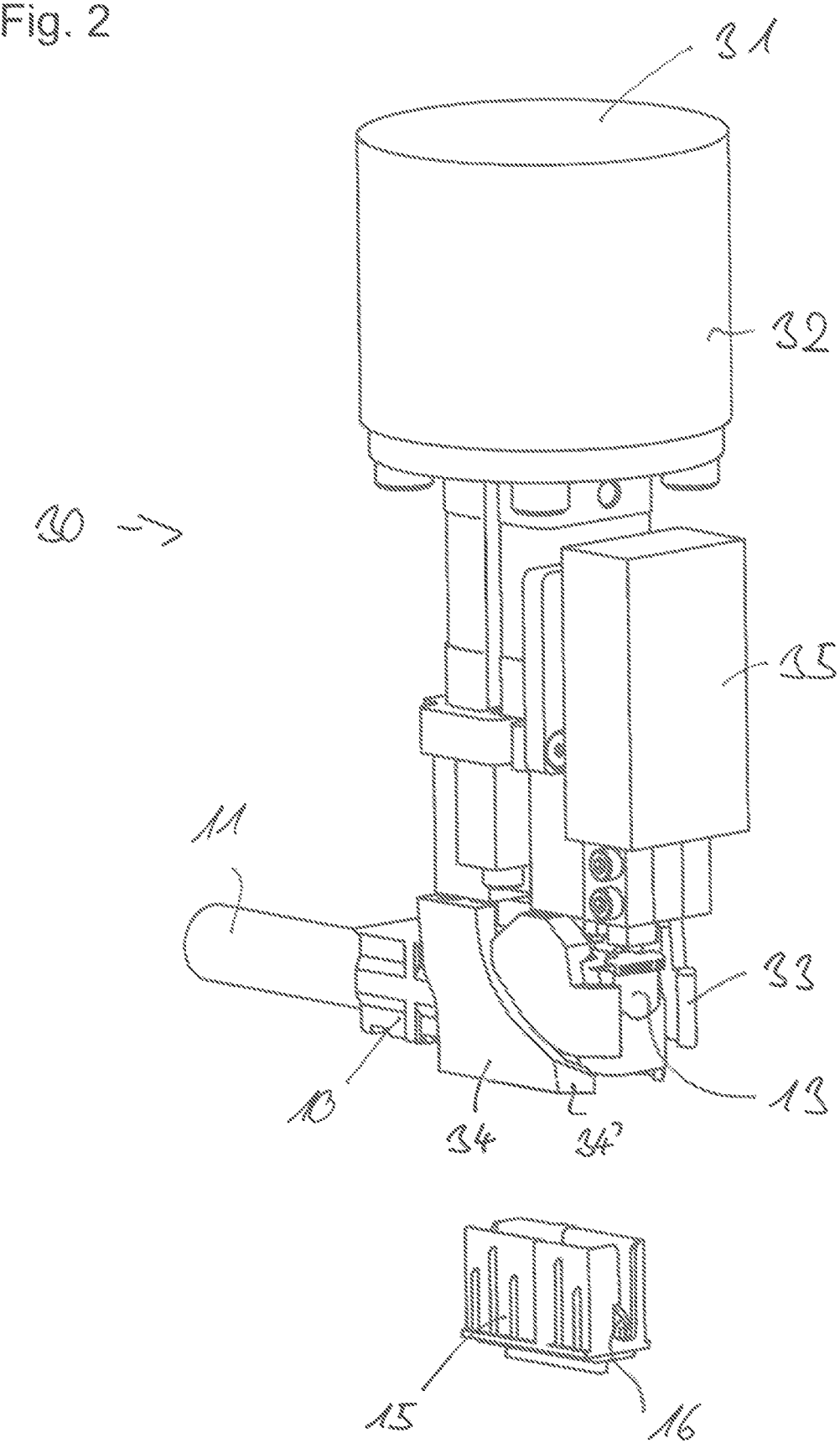
FIG. 2: a first embodiment of a gripper in accordance with the disclosure.
Figure 3:
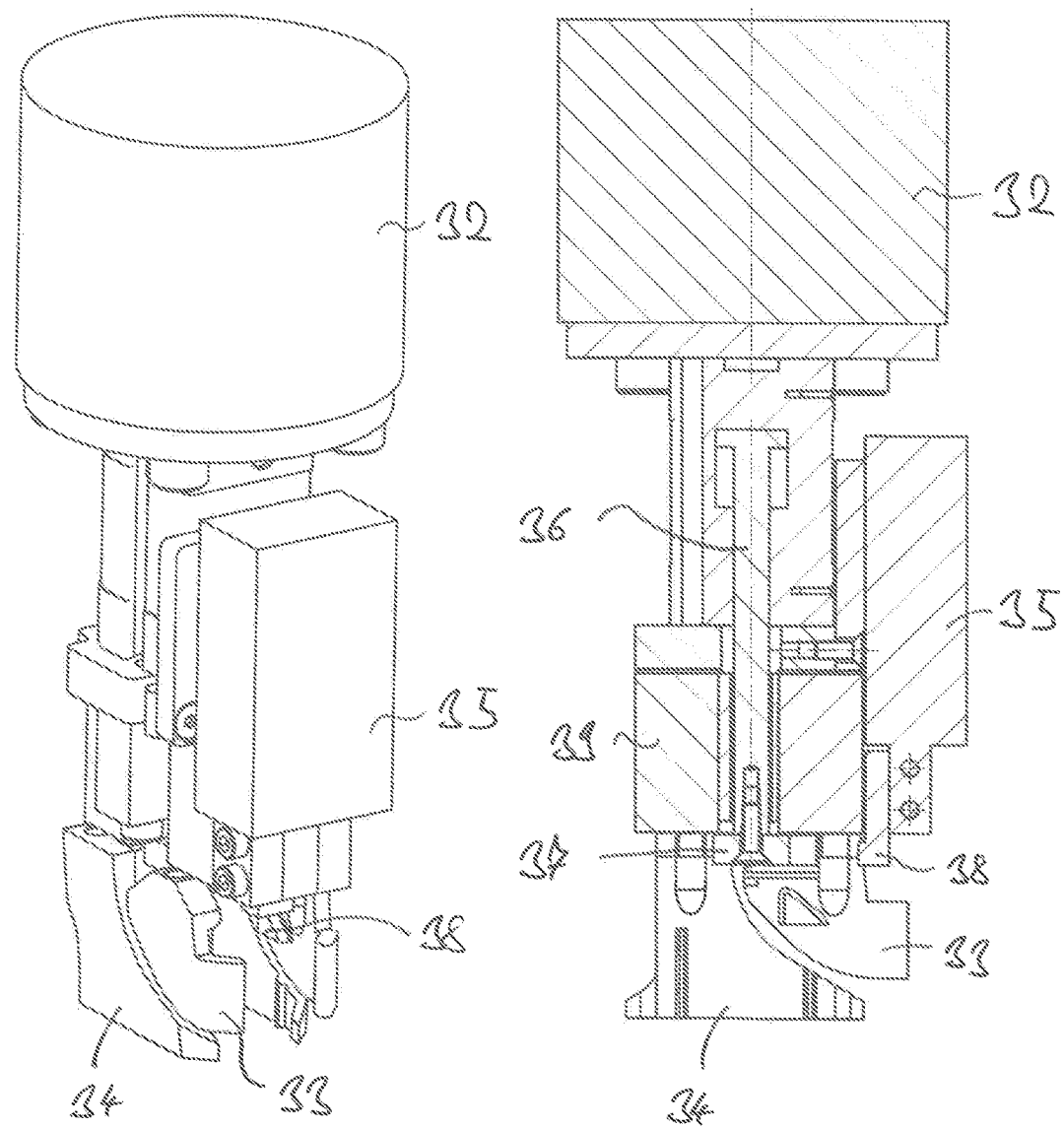
FIG. 3: a perspective view and a sectional view of the gripper shown in FIG. 2.
Figure 4:
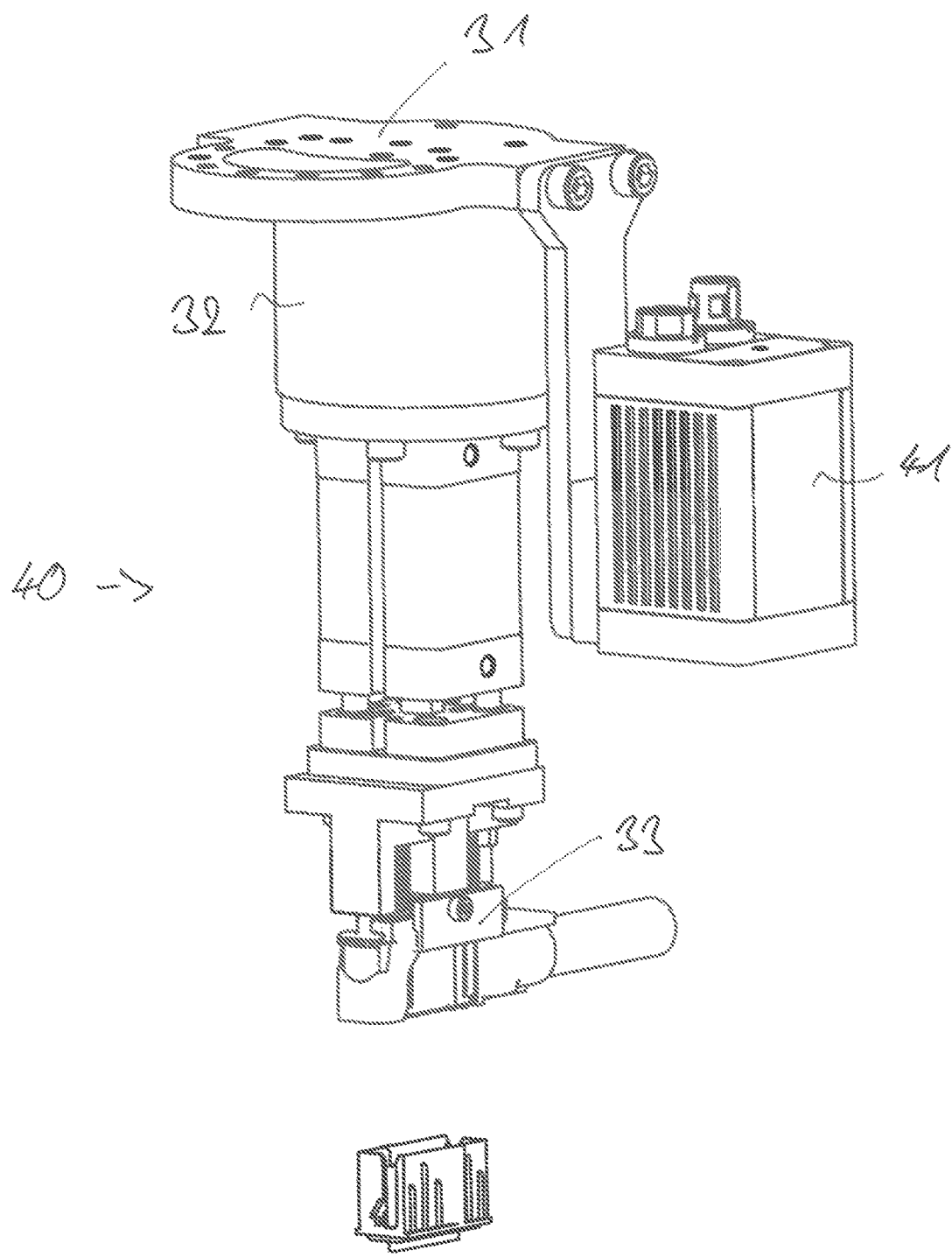
FIG. 4: a second embodiment of a gripper in accordance with the disclosure.
Figure 5:
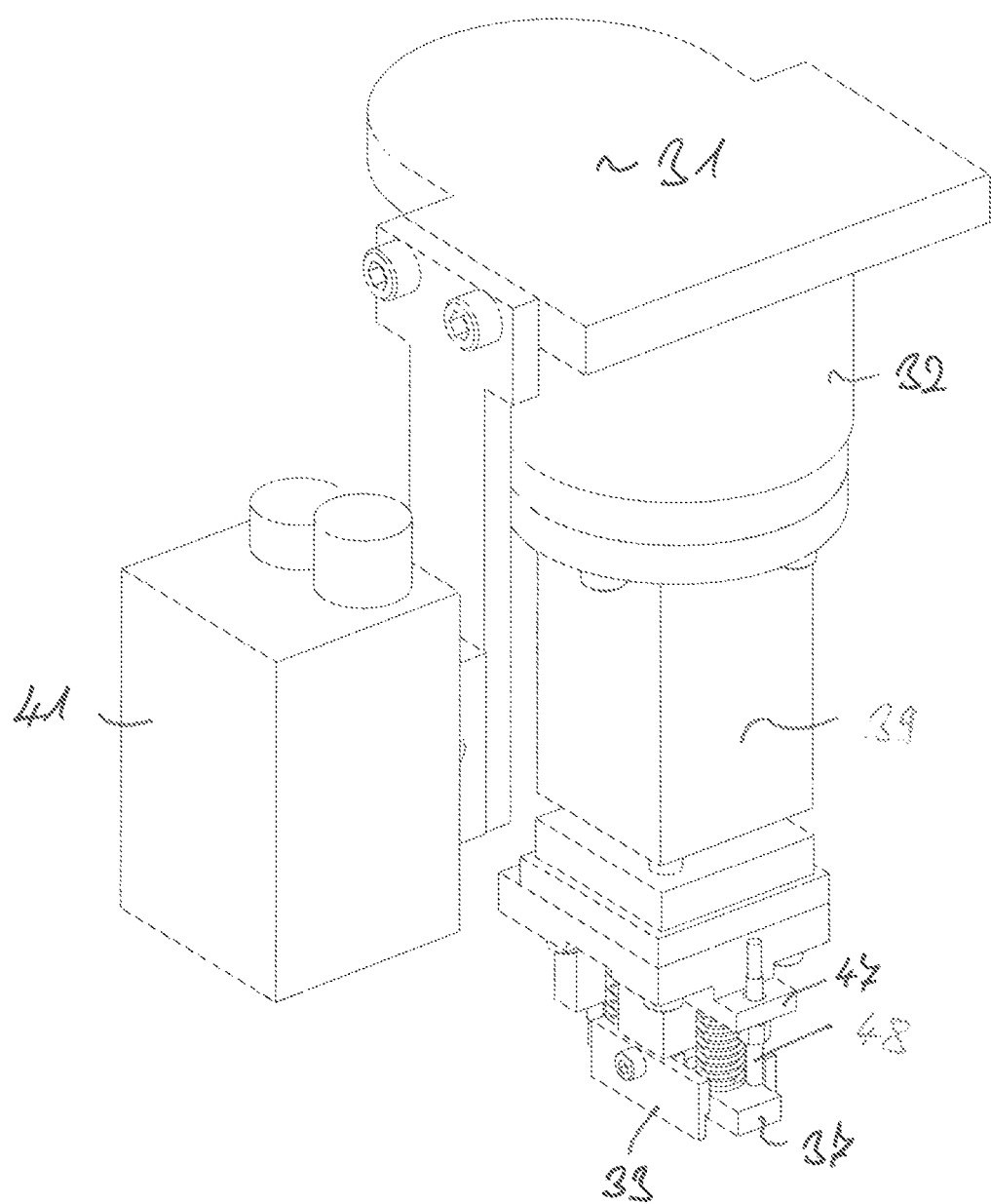
FIG. 5: a perspective representation of the second embodiment shown in FIG. 4.

The features in accordance with the disclosure of the device shown in FIG. 1 will be described in more detail in the following. Embodiments of grippers in accordance with the disclosure that are used for gripping the plug should, however, first be described. FIGS. 2 and 3 here show a first embodiment of a gripper in accordance with the disclosure for gripping a plug; FIGS. 4-6 show a second embodiment.

The grippers here each serve to grip a plug 10 that is pushed into a plug mating element 15 in the form of a plug strip. The plug 10 is here arranged at a cable 11 and establishes an electrical connection between the cable 11 and the plug mating element 15.

In the embodiment, the plug 10 has a latching element 13 that is mechanically actuable and that latches the plug in the plugged in position. The latching element 13 can for this purpose cooperate with a mating element 16 of the plug mating element which can, for example, be a latching nose. Grippers in accordance with the disclosure can, however, also be used for plugging plugs without a latching element.

In a first aspect of the present disclosure, the movement by which the plug is pushed into the plugged in position with the plug mating element 15, at least does not exclusively take place by the handling unit 20+, but rather at least in part also by a plug-in actuator 36 of the respective gripper. The use of such a plug-in actuator 36 that can also be called a joining actuator permits the grippers in accordance with the disclosure to establish the plug-in connection more efficiently and with greater freedom from strain for the plug and the plug mating element.

The plug-in actuator can be a linear actuator that moves the plug into a plugged-in position with the plug mating element 15. The plug-in actuator 36 may press the plug 10 onto an end abutment of the plug mating element 15 in this process to join the plug-in connection.

The axis of movement of the plug-in actuator 36 extends in the embodiment perpendicular to the axis of movement of the gripping jaws 33 of the gripper. The axis of movement of the plug-in actuator 36 is furthermore perpendicular to a plane defined by the upper side of the plug 10 or by the contact surface of the pushing element 37. The axis of movement of the plug-in actuator 36 furthermore extends in the plug-in direction of the plug.

The joining actuator 36 in the embodiments is a pneumatic cylinder in each case. Any desired other actuators, for example any desired other linear actuators are also conceivable, for example an electromechanical drive or a hydraulic drive.

To grip the plug 10, the gripper has one or more respective gripping elements 33 via which the plug is gripped. The gripper can, for example, be a mechanical, pneumatic, and/or magnetic gripper. In a possible embodiment of the present disclosure, the gripper is a vacuum gripper and/or an adaptive shape gripper. In the embodiments shown, the gripper is a mechanical gripper. Mechanical gripping elements, such as two gripping jaws, are accordingly used that can be moved toward one another by means of an actuator to grip the plug. In alternative embodiments, however, other grippers can also be used, for example pneumatic grippers.

In the embodiments, the plug-in actuator 36 for moving the plug does not, however, act on the plug 10 by the gripping elements 33, but rather in that the plug-in actuator 36 moves a pushing element 37 that presses against the upper side of the plug 10 and pushes it into the plugged-in position.

In the embodiments, the gripper is here controlled such that the gripping elements 33 loosen or release their grip on the plug before the plug-in actuator has moved the plug into the plugged position.

In the embodiment shown in FIGS. 2 and 3, the plug-in actuator 36 here moves the pushing element 37 relative to the gripping elements 33 of the gripper. In this embodiment, the plug-in actuator here acts between a base body of the gripper at which the gripping elements 33 are also arranged and the pushing element 37 so that a movement of the plug-in actuator 36 does not result in a movement of the gripping elements 33.

In the second embodiment shown in FIGS. 4-6, the plug-in actuator 36 in contrast moves both the gripping elements 33 of the gripper and the pushing element 37. The plug is, however, pushed into the final plug-in position by the pushing element 37 while the gripping elements 33 only move along with the plug.

In alternative embodiments, it would, however, also be conceivable that the plug-in actuator moves the gripping elements to move the plug received in the gripping elements into the plugged-in position by means of the gripping elements.

In the embodiment, the control 50 is respectively designed such that it controls the handling unit to move the plug into an engagement position with the plug mating element 15. The handling unit is thereupon no longer moved on, but the plug-in actuator is rather controlled to move the plug into the final plug-in position with the plug mating element 15 with a stationary handling unit. The handling unit is therefore only used to bring the plug into engagement with the plug mating element; the actual plug-in procedure then follows via the plug-in actuator 36.

As already shown above, the grip of the gripper is here loosened or released after the plug has been moved into the engagement position and the plug is then pushed into the final plug-in position by the pushing element.

In the embodiment, the grippers each have an installation element 31 by means of which they are installed at the end member of the handling unit. As can be seen in FIG. 4, it can be a flange plate.

The plug-in actuator 36 is here arranged at the gripper such that it can move an element of the gripper, for instance the pushing element 37 and/or the gripping elements 33 of the gripper, relative to this installation element 31 and thus relative to the end member to the handling unit.

In a further aspect of the present disclosure that is also part of the present disclosure independently of the use of a plug-in actuator, the embodiments of the grippers in accordance with the disclosure comprise a compensation unit 32 that permits an escape movement of the gripper relative to the installation element 31 and thus relative to the end member of the handling unit in at least one operating mode.

In both embodiments, the plugging of the plug into the final plug-in position here takes place in a state of the compensation unit in which it enables a compensation movement. Strains that would otherwise be transmitted from the handling unit onto the plug are hereby kept away from it.

In a possible embodiment, the compensation unit 32 can be switched, and from a first operating mode in which the compensation unit permits a compensation movement of the gripper with respect to the handling unit, into a second operating mode in which the gripper is rigidly arranged at the handling unit. In alternative embodiments of the present disclosure, the compensation unit can also always be in the first operating mode in which it permits a compensation movement.

The compensation unit 32 can here have one or more springs against whose preload the gripper can deflect laterally or in the axial direction.

The compensation unit can here be set up such as is described in document EP 2 679 354 A2 of the same applicant with respect to FIGS. 16-22.

The switchability can here, for example, be provided pneumatically in that a retaining force by which the gripper is fixed with respect to the installation element 31 is pneumatically produced to fix the switching unit.

In a further aspect of the present disclosure that can likewise be used independently of the previously described aspects, the gripper comprises a latching device for latching the latching element 13 of the plug 10.

In the embodiment, a respective contact element 38 is provided for this purpose that contacts the latching element 13 in the plugged-in position of the plug 10 and moves it into the latched position.

The contact element 38 is movable via an actuator of the gripper in both embodiments. It is a linear actuator in both cases. Either the plug-in actuator 36 or a further actuator 35 separate therefrom can be used as the actuator.

In both embodiments, the arrangement for moving the contact element 38 is in any case designed such that the contact element is movable relative to the pushing element 37 by which the plug is pushed into the plugged-in position to actuate the latching element 13 of the plug.

Since the two embodiments of the gripper are each used as part of the industrial installation of cables and plugs, the position of the plug mating element is already known in advance from the geometry of the device at which the plug is to be plugged. However, certain deviations of the actual position from the intended position occur in industrial production due to tolerances.

To be able to compensate these deviations, the two embodiments each have an alignment device by which the plug can be aligned in the correct position relative to the plug mating element to enable a plugging of the plug despite a deviation of the actual position of the plug mating element from the position intended for it.

These alignment devices are also each separate subject matters of the present disclosure independently of the above-described aspects.

In the embodiment shown in FIGS. 2 and 3, the alignment of the gripper takes place mechanically via an alignment element 34 of the gripper that is brought into contact with the plug mating element and with at least one side surface of the plug mating element to align the plug with the plug mating element.

In the embodiment, two alignment elements 34, they are designed as alignment jaws in the embodiment, are provided for this purpose that are movable relative to one another via an actuator. The alignment elements 34 here form gripping elements that engage around the plug mating element 15.

The alignment of the gripper relative to the plug mating element 15 takes place here in an operating mode of the compensation unit 32 in which it permits a compensation movement of the gripper. The gripper is therefore aligned with respect to the plug mating element 15 by the closing of the alignment elements around said plug mating element 15. This takes place directly in a direction of movement of the alignment elements 34 by the actuator of the alignment elements 34, in a direction perpendicular thereto by the run-on chamfers 34' of the alignment elements 34 that engage around edges of the plug on both sides and center them with respect to the alignment elements 34.

Both the alignment elements 34 and the gripping elements 33 are arranged at a base body 39 of the gripper. The axes of movement of the alignment elements 34 and of the gripping elements 33 extend in parallel with one another.

In the embodiment, the alignment elements 34 extend at least in part in the plug-in direction below the gripping elements 33 for gripping the plug 10.

The alignment elements 34 in the embodiment hereby project beyond the front side of the plug mating element 15 so that run-on chamfers 34' come into contact with the corners of the plug when the alignment elements 34 close in a position in which the plug mating element 15 is actually arranged further forward than intended.

The pushing element 37 is likewise arranged at the base body 39 of the gripper via the plug-in actuator 36 and can therefore be moved independently of the gripping elements 33 and the alignment elements 34.

The pushing element 37 is here arranged between the respective gripping elements 33 engaging around the sides of the plug or of the plug mating element and the alignment elements 34 over the reception region for the plug formed by the gripping elements 33 and so presses onto the upper side of the plug to push it into the plug mating element 15.

The plugging in this respect runs as follows:

The handling first moves the gripper with the plug 10 gripped by the gripping elements 33 into an alignment position in front of the plug mating element in which the plug 10 does not yet contact it, but the alignment elements 34 are already arranged to the side of the plug mating element 15. This takes place on the basis of a predefined position of the end element of the handling unit determined on the basis of the intended position of the plug mating element 15. In certain embodiments, if the compensation element is switchable, this takes place with a rigidly connected compensation unit.

The alignment of the gripper taking place subsequent thereto takes place with a released compensation unit. The alignment elements 34 hereby center the gripper with the plug 10 in the correct position above the plug mating element 15.

The handling unit 20 now moves the plug 10 into the plug mating element 15 so that the plug comes into engagement therewith.

The gripping elements 33 are now opened. The plug-in actuator 36 presses the plug 10 onto the end abutment. The plug is now in the final plug-in position.

In the embodiment, the gripper furthermore comprises a latching device for latching the latching element 13 of the plug as soon as the latter is in the final plug-in position.

A contact element 38 that is traveled toward the latching element 13 is provided for this purpose. In the embodiment, the contact element 38 moves the latching element 13 in the plug-in direction.

To move the contact element 38, a latching actuator 35 is provided via which the contact element 38 is arranged at the base body 39 of the gripper. The contact element can therefore be moved independently of the gripping elements 33, the alignment elements 34, and the pushing element 37.

The latching actuator 35 in the embodiment is a linear actuator, for example a pneumatic cylinder.

The latching actuator here actuates the latching element, for example the latching pin of the plug, after the latter is in the final plugged-in position.

The plug-in procedure is thus concluded.

In the embodiment shown in FIGS. 4 to 6, the alignment of the gripper takes place via a camera 41 that is arranged at the gripper and via which the actual position of the plug mating element 15 is detected and via a corresponding position correction by the handling unit 20.

The position detection takes place in the embodiment via image recognition. The position detection can, however, also take place in alternative embodiments via more complex camera-based sensors by which the actual position of the plug matting element 16 is detected two-dimensionally or three-dimensionally, for example a laser scanner.

In the embodiment, the camera 41 is arranged next to the base body 39 of the gripper and is set back with respect to the gripping elements 33. The optical axis of the camera 41 is aligned in parallel with the plug-in direction of the plug or of the axis of movement of the plug-in actuator 36 in the embodiment.

In the embodiment, the camera is fastened to the installation element 31 to which the compensation unit 32 is also fastened and is therefore connected to the handling unit without the interposition of the compensation unit 32.

The determination of the actual position of the plug mating element 15 takes place in that the handling unit travels the camera 41 over the plug mating element 15. This takes place on the basis of the intended position of the plug mating element 15. The actual position of the plug mating element 15 is detected by image recognition and the offset from the intended position is determined.

The handling unit now travels the gripper with the plug 10 into a plug-in position in front of the plug mating element 15 while taking account of the offset determined by the camera. The handling unit then travels the plug 10 into the plug mating element 15 so that the two are in engagement with one another.

If the compensation unit is switchable, the traveling to the plug-in position in front of the plug mating element 15 takes place with a rigidly connected compensation unit.

The compensation unit is in contrast can be released for the movement of the plug 10 into the plug mating element 15. Alternatively, the compensation unit can also be released after the plug has been brought into engagement with the plug mating element 15 via the handling unit.

The plug-in actuator is now controlled to press the plug onto the end abutment. This is done with a released compensation unit.

The pressing of the plug into its final plugged-in position also does not take place via the gripping elements 33, but rather via a pushing element 37 in the second embodiment shown in FIGS. 4 to 6. Said pushing element 37 is likewise arranged between the gripping elements 33 above the reception region for the plug formed by it and therefore presses onto the upper side of the plug.

In the second embodiment shown in FIGS. 4 to 6, the gripping elements and the pushing element 37 are, however, both arranged at a base element 46 that is movable in the plug-in direction with respect to the base body 30 of the gripper via the plug-in actuator 36.

The plug-in actuator 36 is arranged at a base body 39 of the gripper that is connected to the end member of the handling unit via the compensation unit 32. Rods 42 are furthermore provided via which the base element 46 is guided in the axial direction of the plug-in actuator 36 with respect to the base body 39.

In the second embodiment, the gripping elements 33 therefore move along with the pushing element 37 while the pushing element 37 pushes the plug into its final plugged-in position. However, they no longer engage the plug 10 during this pushing movement so that no strains are transmitted from the gripper 40 to the plug 10.

The second embodiment of the gripper also has a latching device for latching the latching element 13 of the plug 10. A contact element 38 is provided here that pressure on the latching element 13 by an actuator of the gripper to actuate the former.

In the second embodiment, the contact element 38 is actuated via the plug-in actuator 36 and is arranged at the base element 46 for this purpose.

To permit a further movement of the base element 46 with the contact element 38 after the pushing element 37 has pushed the plug into its final plugged-in position, the pushing element 37 is movably arranged at the base element 46. The pushing element 37 is preloaded in the plug-in direction via springs 44 with respect to the base element 46. The preload of the springs 44 is greater than the plug-in force that is required to plug the plug into its final plugged-in position. Once the plug has been pushed against the end abutment, the base element 46 can, however, approach the pushing element 37 against the force of the springs 44 and can thus actuate the latching element by the contact element 38.

If the base element 46 is moved toward the pushing element 37 and the plug against the force of the springs 44, the gripping elements 33 that are rigidly arranged at the base element 46 in the axial direction move together with the latter in the plug-in direction or in the axial direction.

The gripping elements 33 are equipped with an undercut 43 that engages around the upper edge of the plug and that thus prevents the plug from falling out of the gripper on a gripping of the plug. The plug can, however, be moved upward within the gripping elements 33 against the preload of the springs 44, with the upper edge engaged around by the undercuts 43 moving upward in a cut-out in the inner side walls of the gripping elements.

In the embodiment, the pushing element 37 is designed as an elongate plate that is guided via two rods 43 in cutouts 45 of the base element 46, with the springs 44 surrounding the rods 43 and preloading the pushing element 37 with respect to the base element 46.

A sensor 48 is furthermore arranged at the base element 46 and recognizes when the base element 46 has been moved into a position in which the contact element was actuated. In the embodiment, the sensor 48 is installed in a projection 47 at the base body 46 and is designed as a proximity sensor that recognizes an approach of the pushing element 47 to the lower side of the sensor 48.

The contact element 38 is movably arranged in the plug-in direction at the base element 46 and is preloaded in the plug-in direction via a spring. The preload of the spring is here greater than the force required to actuate the latching element. If the latching element is actuated, the movable support of the contact element protects the latching element from damage when the base element 46 is moved further toward the plug.

The previously described grippers serve the gripping of a plug to connect it to a plug mating element.

In accordance with a further independent aspect of the present disclosure, the device in accordance with the disclosure comprises, in addition to a first gripper for gripping a plug, a second gripper that is used to grip the cable or a second plug arranged at the other end of the cable. If the second gripper for gripping the other plug is used, cables at whose two ends plugs are arranged can be connected to corresponding plug mating elements by the device in accordance with the disclosure. If the second gripper is used to grip the cable, the present disclosure enables a positioning of the cable in accordance with a desired extent of the cable. This can be of advantage on the installation of longer cables since the pliable design of the cables makes a positioning of longer cables difficult solely by a positioning of the plugs.

The first and second grippers can each be arranged at a first and second handling unit having a plurality of axes of movement to be moved independently of one another at least in part.

Figure 7:
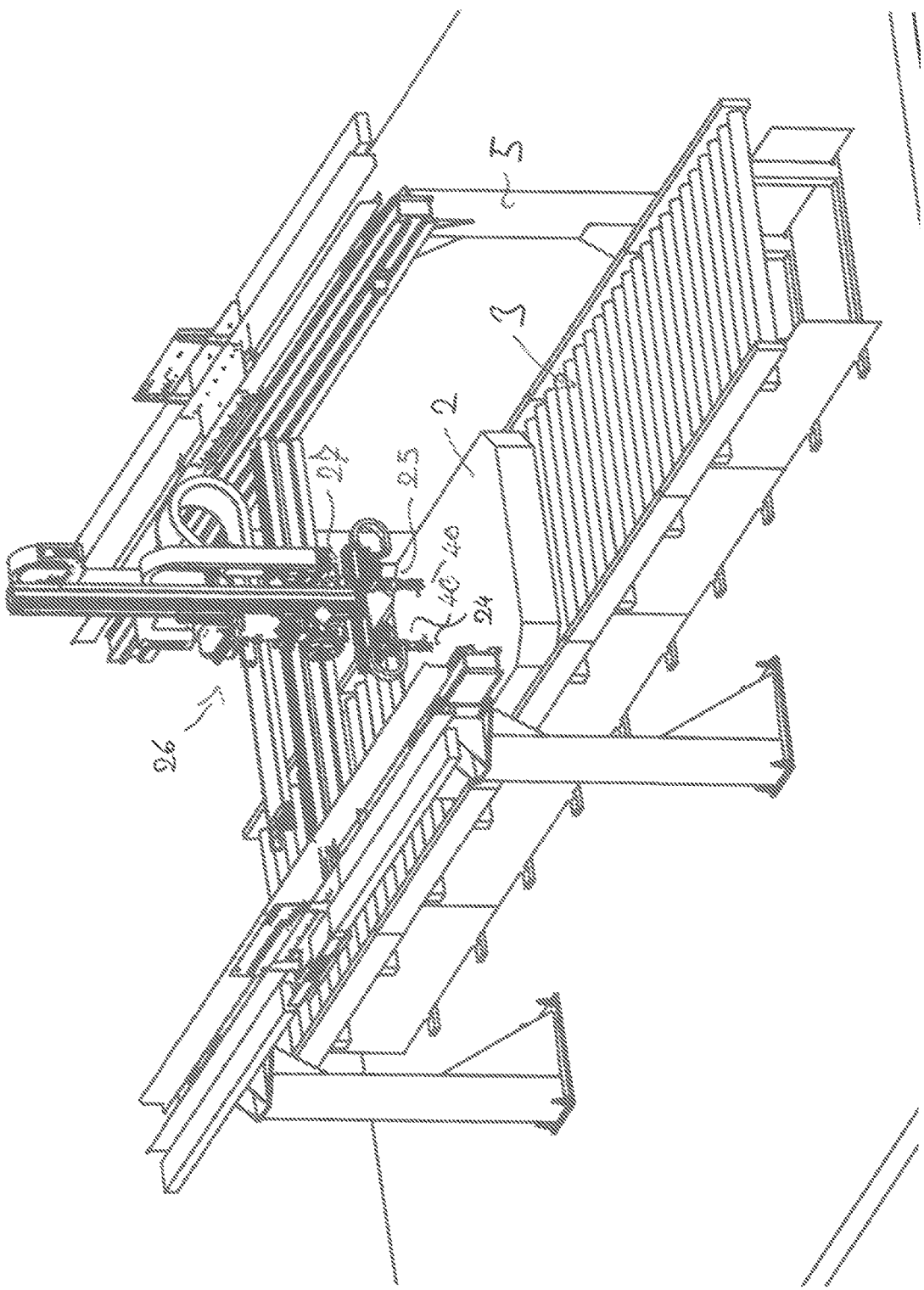
FIG. 7: a second embodiment of a device in accordance with the disclosure for the automated establishment of a plug-in connection.
Figure 8:
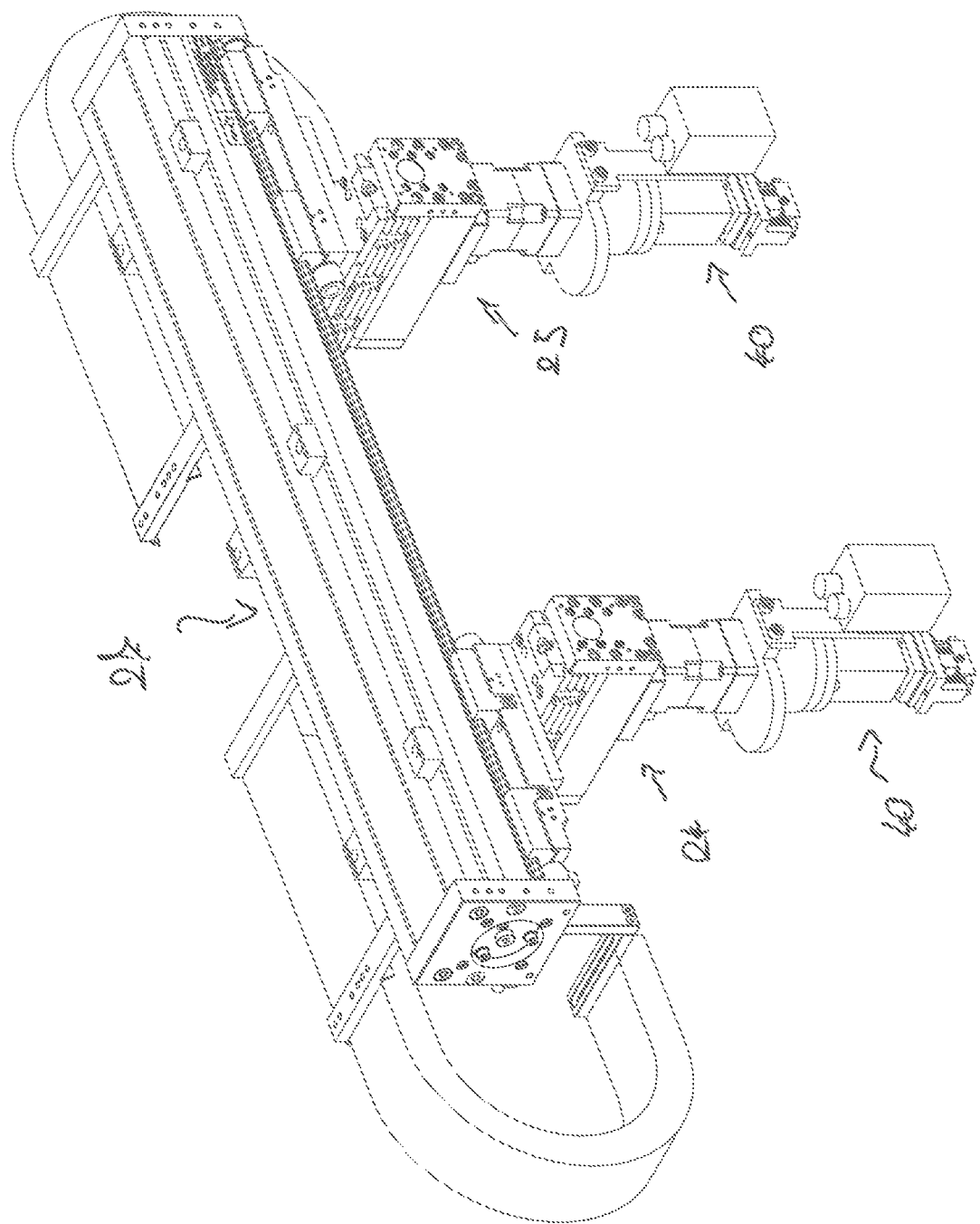
FIG. 8: a detailed view of the handling unit that is used in the second embodiment of the device shown in FIG. 7.

FIGS. 7 and 8 show a second embodiment of a device in accordance with the disclosure having two grippers 40, with the two grippers each being movable via separate handling units 24, 25, but with these handling units in turn being arranged at a common support element that is movable via a third handling unit 26.

The movement space of the handling units 24 and 25 is smaller than that of the third handling unit 26. The handling unit 26 serves the rough positioning of the twin gripper formed via the two grippers 40. The two handling units 24 and 25 in contrast serve the fine positioning of the grippers, for instance the positioning of plugs received in the two grippers with respect to the corresponding plug mating elements.

In the embodiment, the two handling units 24 and 25 are configured as mini surface portals, with the support element 27 representing a movement rail at which a side of the respective handling unit is travelable. A further slide of the respective handling units forms a further axis extending perpendicular thereto.

A further axis of the handling units 24 and 25 in the plug-in direction is not necessary since, where necessary, the plug-in actuator of the respective gripper can carry out a position compensation in the plug-in direction.

The third handling unit 26 is a three-dimensional portal that is arranged via a support device 5 above a transport line 3 on which the support device 2 for the battery modules is transported to the device in accordance with the disclosure.

In the embodiment shown in FIGS. 7 and 8, the two grippers 40 are each grippers in accordance with the second embodiment of the present disclosure. Grippers in accordance with the first embodiment could, however, also be used in the same manner.

The device shown in FIGS. 7 and 8 may be used for plugging shorter cables in which a support of the cable is not necessary, but the positioning of the cable can be carried out by the corresponding positioning of the plugs.

Figure 9:
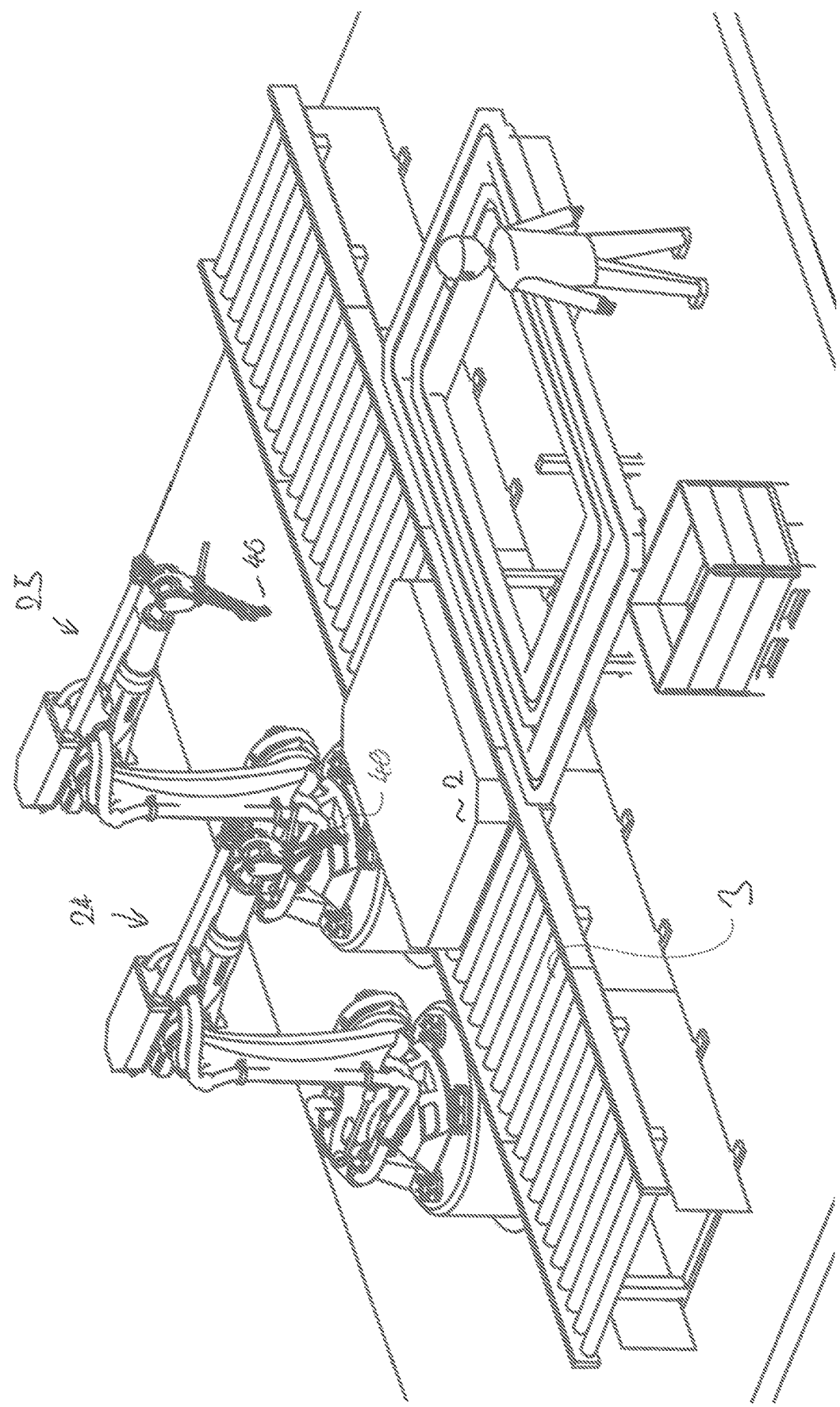
FIG. 9: a third embodiment of a device in accordance with the disclosure.

In the third embodiment of a device in accordance with the disclosure shown in FIG. 9, two grippers 40 for gripping plugs are likewise arranged at handling units 24 and 25. The handling units 24 and 25 are, however, designed as completely separate and are arranged at a rigid support arrangement.

In the embodiment, the two handling units are multi-axial robots having rotational axes, such as 6-axis industrial robots. They permit moving the two grippers independently of one another in each case.

In the embodiment, the grippers are arranged via a gripping arm extension at the respective end element of the handling unit 24, 25 to avoid a collision of the handling units.

This embodiment also serves the plugging of short cables in which the cable itself does not have to be supported or gripped.

A gripper in accordance with the first embodiment could also be used here instead of a gripper in accordance with the second embodiment.

Figure 10:
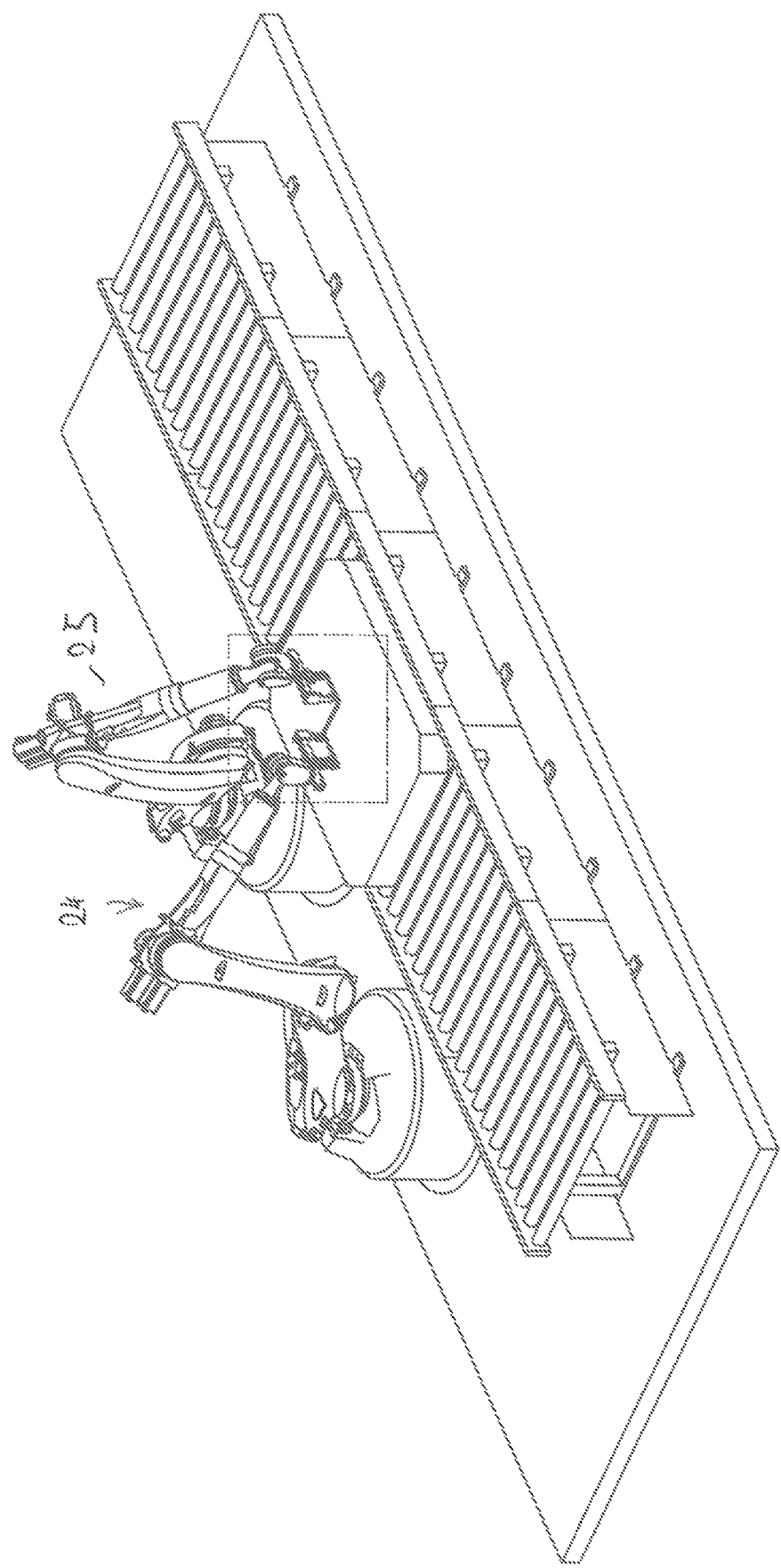
FIG. 10: a fourth embodiment of a device in accordance with the disclosure.
Figure 11:
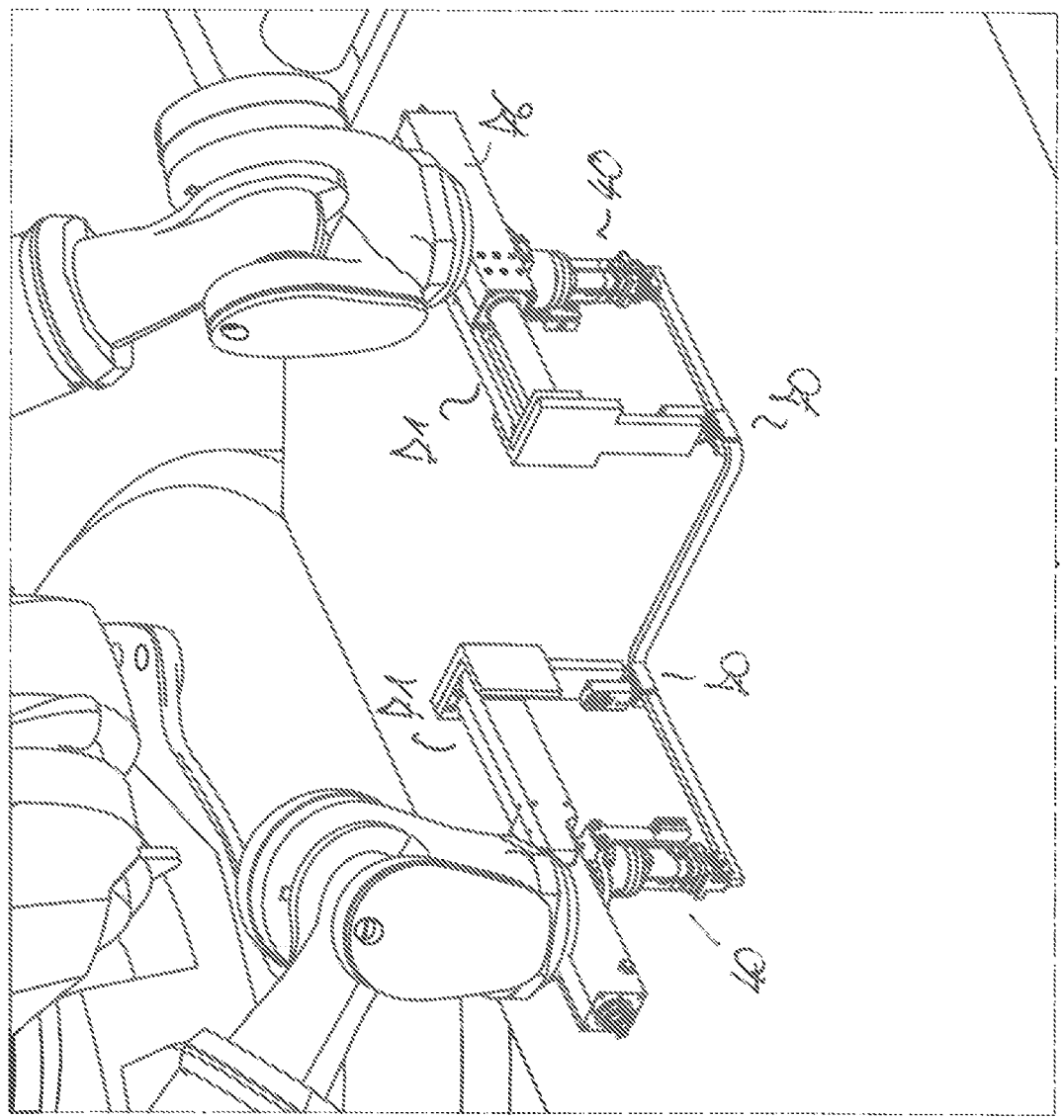
FIG. 11: a detailed view of the device shown in FIG. 10 on the positioning of a cable.

A fourth embodiment of a device in accordance with the disclosure is shown in FIGS. 10 and 11 that also comprises a gripper 70 for gripping the cable in addition to a gripper 40 for gripping the plug. In the embodiment, two grippers 40 are provided here for gripping the plugs arranged at the two ends of a cable and also two grippers 70 for gripping the cable in the embodiment. Depending on the design, however, only one such gripper 70 for gripping the cable and/or only one gripper 40 for gripping a plug could also be used.

Longer cables can also be positioned or non-linear cable guides can be implemented by the additional gripper 70 for gripping the cable.

Figure 12:
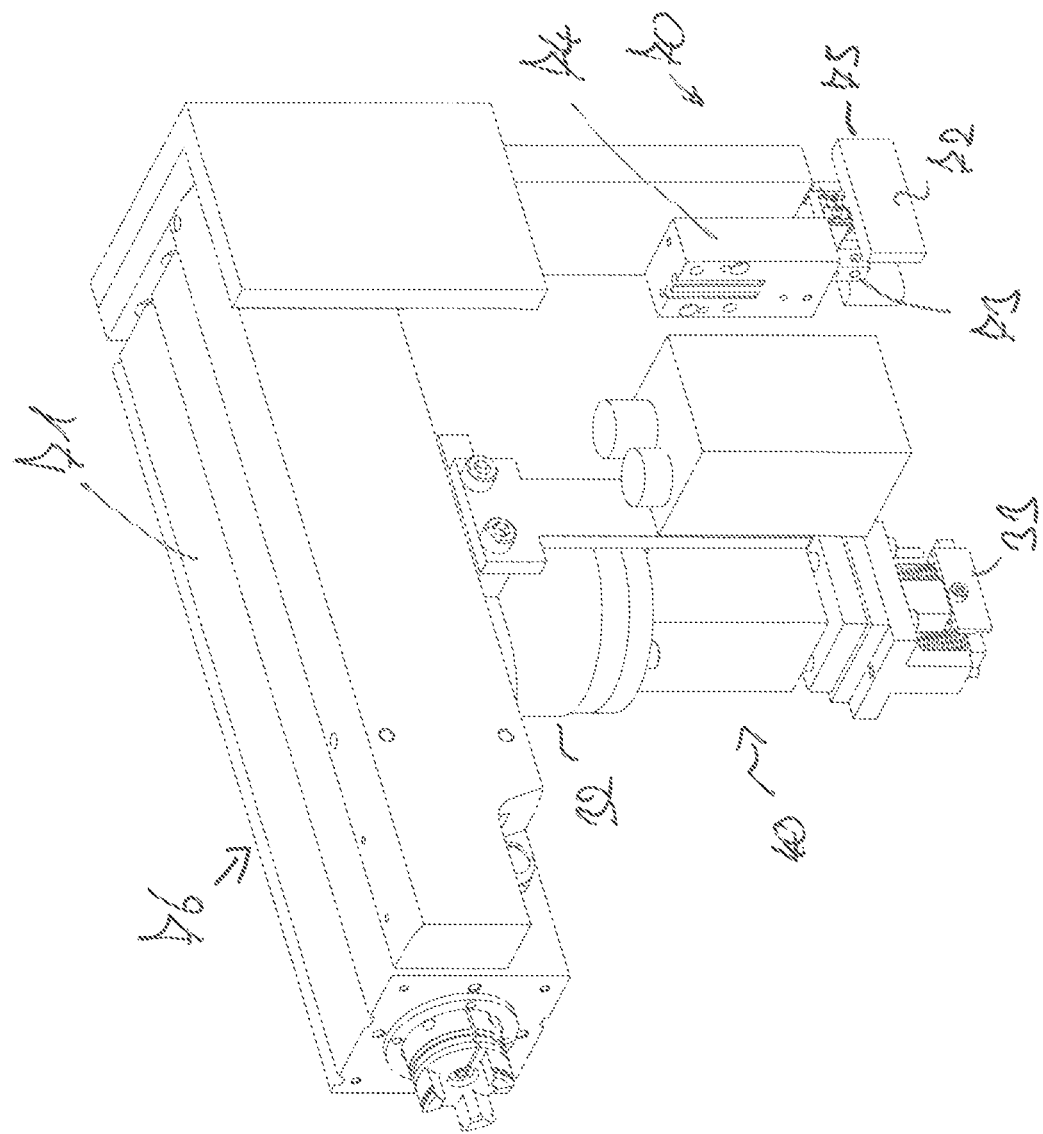
FIG. 12: a third embodiment of a gripper in accordance with the disclosure such as is used in the embodiment in accordance with FIGS. 10 and 11 of the device.

In the embodiment shown in FIGS. 10 and 11, a combination bending gripper is used such as is shown in FIG. 12. An alternative embodiment for this gripper is shown in FIG. 16. The following description relates to both aspects if nothing is explained in more detail in this regard. In the two embodiments, a gripper 70 for gripping the cable is combined with a gripper 40 for gripping the plug, with the two grippers being arranged at a common handling unit 24, 25.

In the embodiment, the two handling units 24, 25 are multi-axial robots having rotational axes, for instance 6-axis industrial robots. Alternatively, surface portals could also be used here or a solution such as is shown in FIGS. 7 and 8.

A gripper in accordance with the second embodiment of the present disclosure is furthermore used as the gripper 40 for gripping the plug in the embodiment. Alternatively, however, another gripper, for example a gripper in accordance with the first embodiment, could also be used.

The gripper 70 for gripping the cable is a mechanical gripper having two gripping elements 72 that can be moved toward one another via an actuator to receive and mechanically hold the cable between them. In the embodiment in FIG. 12, the gripping elements are gripping fingers or gripping jaws. In the embodiment in FIG. 16, rollers are used as gripping elements.

The gripper 70 is combined with the gripper 40 such that the cable is guided in a straight direction away from the plug to the gripper 70 when the plug and the cable are gripped by the respective grippers. The respective gripping jaws 33, 72 of the grippers 40. 70 may extend in parallel and the respective axes of movement of the actuators for moving the gripping elements likewise extend in parallel.

In the embodiment, the gripper 70 for gripping the cable is connected via a linear axle 71 to the gripper 40 for gripping the plug. The distance at which the gripper 70 grips the cable from the plug can be set via this linear axle.

In certain embodiments, the gripper 70 has the object of stabilizing the preshaped cable to prevent it from sagging, and to hold it in shape and/or to kink the cable at a defined point if it is not preshaped.

As can be recognized in FIG. 11, the gripper 70 is used to bend the cable in the embodiment.

The front edge 75 of the gripping jaws 72 of the gripper 70 in FIG. 12 has a radius of curvature for this purpose around which the cable can be kinked.

The gripper jaws 72 may either be designed as relatively wide to keep the bending torque of the cable away from the plug 10 or two grippers 70 are used that successively engage at the cable. The gripper jaws 72 can have a length of more than two centimeters, or of more than five centimeters.

In the embodiment in FIG. 16, a radius of curvature about which the cable can be kinked results from the configuration of the gripping elements 72 as rollers.

The axis of the rollers 72 extends in the embodiment perpendicular to a plane in which the cable extends and/or perpendicular to the direction of movement of the linear axle 71 and/or in the plug-in direction of the first gripper 40.

The rollers may be rotatably supported. In a possible embodiment, the rollers can be fixed in at least one rotational position, for example by an actuator that travels the rollers axially toward a braking element.

The rollers 72 therefore grip the cables laterally at their periphery. In the embodiment, a respective undercut in the form of a peripheral groove is provided at the periphery of the rollers 72 by which the cable is engaged around and is hereby secured at the gripper.

The gripper 70 can be traveled along the cable while it grips the cable to position it and to kink it in the end position of the travel path.

The second gripper such as is shown in FIG. 16 can, in alternative embodiments, also be used independently of the first gripper to guide the cable. Such a design will be described in the following in connection with FIGS. 14 and 15. The description there also applies identically to a second gripper 70 such as is shown in FIG. 16.

The first gripper 40 in the embodiment is arranged at a support element 76 that includes the linear axle 71 at which the gripper 70 is arranged. The support element 76 to which the two grippers are fastened is in turn arranged at the end member of the handling unit.

An additional actuator 74 that can press on the cable via a contact element 73 is arranged at the gripper 70 for gripping the cable to press said cable, for example, into a clip or into a cable passage. In some embodiments, the axis of the actuator or the axis of movement of the contact element 73 extends perpendicular to the extent of the cable through the gripper and perpendicular to the closing direction of the gripping elements 72 and/or in parallel with the plug-in direction for plugging the plug. In this respect, the rollers 72 of the embodiment in FIG. 16 can also serve as a contact element. In this case, the additional actuator moves the second gripper 40. In certain embodiments, it moves the second gripper perpendicular to the extent of the cable through the gripper and perpendicular to the closing direction of the gripping elements 72 and/or in parallel with the plug-in direction for plugging the plug to press the cable held at the second gripper 40 into a clip or into a cable passage.

The device shown in FIGS. 10 and 11 can also be used for plugging cables having only one kink or without a kink. The additional grippers 70 serve in this case at least also the stabilizing of the cable.

It would be conceivable in alternative embodiments to combine a combination bending gripper such as is shown in FIGS. 12 and 16 with a normal gripper for gripping a plug that is arranged at the other handling unit.

Figure 13:
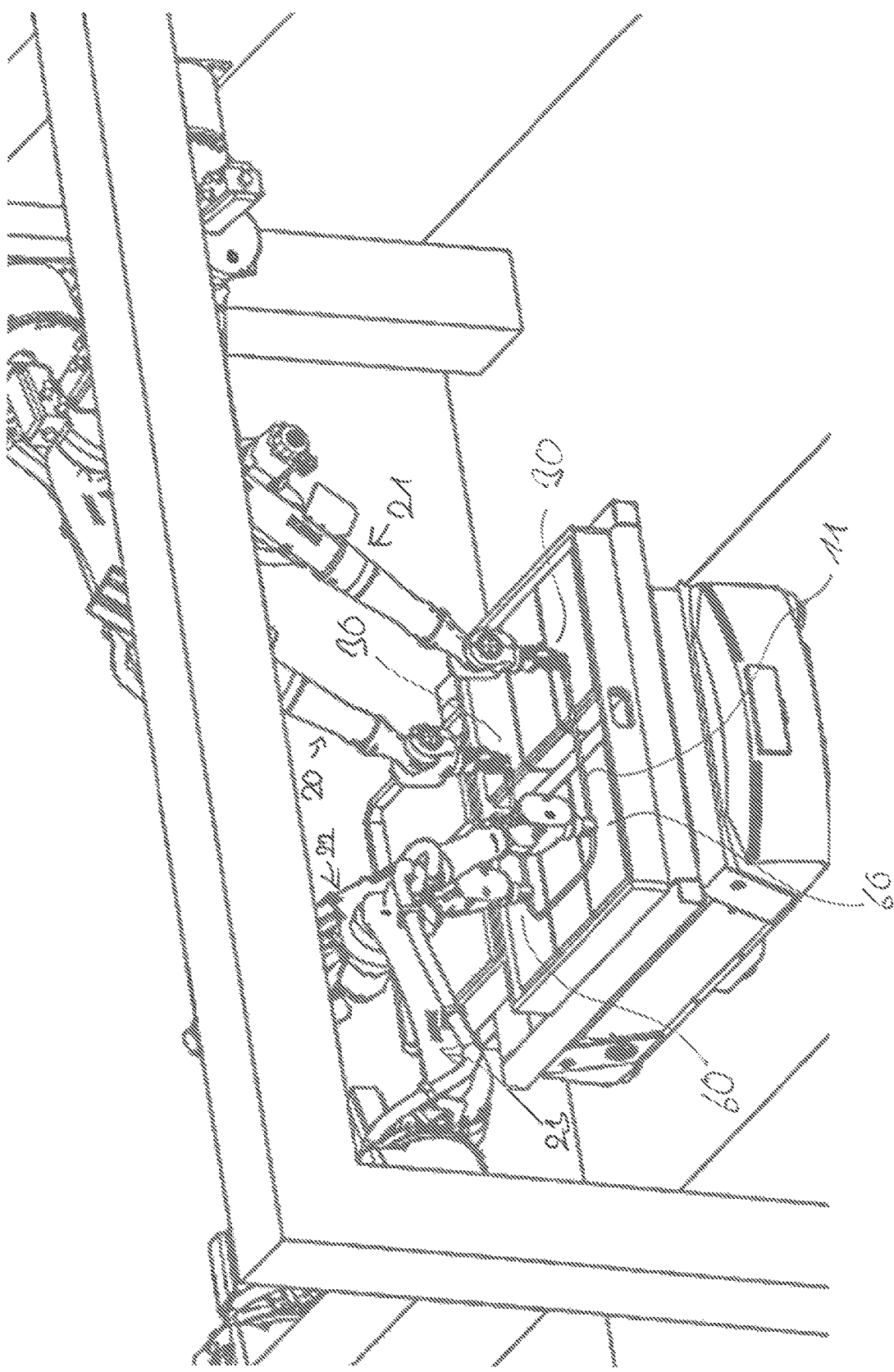
FIG. 13: a detailed view of the first embodiment of a device in accordance with the disclosure already shown in FIG. 1.

The first embodiment of a device in accordance with the disclosure that was already shown in FIG. 1 is shown again in an enlarged view in FIG. 13.

In this embodiment, grippers 60 for gripping the cable are furthermore used in addition to grippers 30 for gripping the plugs, with the grippers 60 for gripping the cable being arranged at separate handling units 22 and 23. The grippers for gripping the plugs are equally arranged at separate handling units 20 and 21.

Such an embodiment serves the plugging of long cables with or without a kink or, as in the embodiment, also with two kinks. The cable can be bent at a defined position or laid at a defined position by the two grippers 60. The two separate handling units take over the plugging of the plugs at the cable ends and at least one further handling unit takes over the positioning or bending and tracking and laying of the cable.

In the embodiment, the handling units are each multi-axial robots having rotational axes, such as 6-axis industrial robots. Alternatively, however, surface portals can also be used here.

A solution such as is shown in FIGS. 7 and 8 would furthermore also be conceivable.

Two or more of the grippers can, for example, respectively be arranged via smaller handling units at a support arrangement that is roughly positioned via a larger handling unit. It may be conceivable that all the grippers are arranged via smaller handling units at a common support element that is positioned via a larger handling unit.

The grippers 60 can be designed as simple mechanical grippers. They can, however, also be configured like the grippers 70 that have already been described in more detail with reference to FIGS. 12 and 16. The grippers 60 may have an additional actuator 74 having a contact element 73 for pressing the cable into a receiver. If the grippers are used to bend the cables, they may have curvatures of radius at the corresponding end of the gripper jaws.

Within the framework of the present disclosure, cable laying grippers can furthermore be used such as are shown in FIGS. 14 and 15. They may be arranged at a separate handling unit and serve the positioning of the cable along a desired path. The cable laying grippers may be used for pushing the cable into a guide passage.

The gripper 80, 90 has gripping elements 81, 91 that serve as guide elements and that are laid at the cable 11. The gripping elements 81, 91 may be rotatably supported so that they can roll off along the cable. In a certain embodiment, the shape of the gripping elements 81, 92 tapers downwardly so that the cable can be pressed downwardly out of the gripping elements.

The gripper furthermore has a pressing element 82, 92 that presses onto the cable from above to press it into a corresponding reception passage, for example.

In the embodiment shown in FIG. 14, the pressing element is arranged between the gripping elements 81 at the height thereof. An actuator 83 may be provided here via which the pressing element 82 can be moved between the gripping elements 81, for example to press the cable into a clip receiver.

In the embodiment shown in FIG. 15, the pressing element 92 is in contrast installed above the cable behind the gripping elements 91 in the direction of movement and presses them, for example, into a cable passage once the cable has left the guide elements 91. The pressing element 92 in the embodiment in FIG. 15 is here resiliently supported at the gripper via springs 93.

In both embodiments, the pressing elements 81, 92 are rotationally supported and in so doing roll off on the cable. In the embodiment in FIG. 14, the pressing element 82 is a narrow roller; n the embodiment in FIG. 15, it is a roller that is wider than the cable.

The cable laying grippers shown in FIGS. 14 and 15 are traveled along the cable via the handling unit at which they are arranged to align the cable along a desired path and/or to press it into corresponding receivers.

The cable layering grippers can be traveled along the cable after the plugs at the cable ends have been connected by other grippers to the corresponding plug mating elements.

In the possible embodiment of the present disclosure, the cable laying grippers are combined with combination grippers such as are shown in FIG. 12, with the additional grippers 70 engaging at the cable keeping strains away from the plug that would otherwise act on the plugs due to the use of the cable laying grippers.

In certain embodiments, the traveling of the laying grippers along the cable takes place along a predetermined route stored in the control. In a possible embodiment, a camera can furthermore be arranged at the laying grippers by which the receiver is detected into which the cable should be pressed to carry out a position correction.

The cable laying grippers can be combined with all the devices in accordance with the disclosure described above.

The invention claimed is:

1. A device for automated establishment of a plug-in connection of a plug arranged at a cable to a plug mating element, the device comprising:
  a gripper connected to a handling unit, said gripper for gripping the plug;
  wherein the handling unit is a multi-axis robot and comprises a plurality of axes for moving the gripper; and a control comprising a microprocessor and a program code stored in a memory, the control being electrically connected with the gripper and the handling unit for controlling the gripper and the handling unit, the control further configured for controlling, by processing of the program code on the microprocessor, the gripper and the handling unit to establish the plug-in connection of the plug to the plug mating element;

wherein the gripper comprises a plug-in actuator operatively coupled to a pushing element for pushing the plug into a plugged-in position with the plug mating element, wherein the pushing element is movable relative to the gripper by actuation of the plug-in actuator, and wherein the control is configured to:
control the gripper to grip the plug;
control the handling unit to move the plug into an engagement position with the plug mating element while the gripper is holding the plug in a grip;
control the gripper to loosen or release the grip; and
control the plug-in actuator to push the plug relative to the gripper by pushing the plug into the plugged-in position with the plug mating element.

2. The device in accordance with claim 1, wherein the plug-in actuator is a linear actuator.

3. The device in accordance with claim 1, wherein the gripper is a mechanical gripper for gripping the plug that comprises at least two mechanical gripping elements, that are movable relative to one another via an actuator, with an axis of movement of the plug-in actuator being perpendicular to an axis of movement of the gripping elements.

4. The device in accordance with claim 1, wherein the control is configured to control the handling unit to move the plug into the engagement position with the plug mating element and control the plug-in actuator to move the plug into a final plugged-in position with the plug mating element while the handling unit is remaining stationary.

5. The device in accordance with claim 1, wherein the gripper has at least one alignment element which contacts with the plug mating element to align the plug with the plug mating element, with the alignment element and the plug held by the gripping element being movable relative to one another by an actuator of the gripper to align the plug with the plug mating element; and/or wherein the alignment element is arranged movable by an actuator at the gripper and moves it relative to the handling unit, with a compensation unit arranged between the gripper and the handling unit being deflected.

6. The device in accordance with claim 5, further comprising at least two alignment elements that encompass the plug mating element at oppositely disposed sides and are travelable toward one another via at least one actuator to align the plug with respect to the plug mating element, with the alignment of the plug taking place by aligning the gripper and/or with the alignment elements gripping the plug mating element, and/or with the control being configured such that the plug is brought into the engagement position with the plug mating element while the at least one alignment element is in contact with the plug mating element and the alignment elements grip the plug mating element, with movement of the plug into a final plug-in position also taking place while the at least one alignment element is in contact with the plug mating element and the alignment elements grip the plug mating element.

7. The device in accordance with claim 1, further comprising a camera for detecting a position of the plug mating element, wherein the control is configured such that the plug received at the gripper is traveled into a plug-in position in front of the plug mating element on the basis of the detected position, with the camera being arranged at the gripper; and with the control being configured such that the camera is first traveled into a measurement position in front of the plug mating element to detect the position of the plug mating element and the plug received at the gripper is thereupon traveled into the engagement position with the plug mating element by repositioning the gripper.

8. The device in accordance with claim 1, wherein the gripper is coupled to the handling unit via a compensation element,
wherein a compensation unit can be switched between a first operating mode in which the compensation unit permits a compensation movement of the gripper with respect to the handling unit and a second operating mode in which the gripper is rigidly arranged at the handling unit, and
wherein the control is configured such that the plug is moved into the position in front of the plug mating element in the second operating mode, and such that the plug-in actuator moves the plug into the plugged-in position in the first operating mode.

9. A device for automated establishment of a plug-in connection of a plug arranged at a cable to a plug mating element, the device comprising:
a gripper connected to a handling unit, said gripper for gripping the plug;
wherein the handling unit is a multi-axis robot comprises a plurality of axes for moving the gripper; and
a control comprising a microprocessor and a program code stored in a memory, the control being electrically connected with the gripper and the handling unit for controlling the gripper and the handling unit, the control being configured for controlling, by processing of the program code on the microprocessor, the gripper and the handling unit to establish the plug-in connection of the plug to the plug mating element;
the gripper comprising a plug-in actuator for moving the plug into a plugged-in position with the plug mating element;
wherein the control is configured to control the gripper to grip the plug, control the handling unit to move the plug into a position in front of the plug mating element, and control the plug-in actuator to move the plug into the plugged-in position with the plug mating element,
wherein the gripper is a mechanical gripper for gripping the plug, said gripper comprises at least two mechanical gripping elements which are movable relative to one another by an actuator, with an axis of movement of the plug-in actuator being perpendicular to an axis of movement of the gripping elements; and
wherein the gripper further comprises a latching mechanism for latching a latching element of at least one of the plug and the plug mating element, and wherein the latching mechanism comprises a contact element for contacting the latching element in the plugged-in position of the plug and the gripper configured to move the contact element relative to the plug.

10. The device in accordance with claim 9, wherein the plug-in actuator moves the contact element relative to the plug, with a pushing element of the gripper for moving the plug being movably, and resiliently, connected to the plug-in actuator and, therefore, after movement of the plug into the plugged-in position, permitting a further movement of the plug-in actuator by which the contact element is moved toward the latching element, with the contact element being movably connected to the plug-in actuator and/or with an end position of the plug-in actuator being recognized via a sensor.

11. A device for automated establishment of a plug-in connection of a plug arranged at a cable to a plug mating element, the device comprising:
- a gripper connected to a handling unit, said gripper for gripping the plug;
- wherein the handling unit is a multi-axis robot and comprises a plurality of axes for moving the gripper; and
- a control comprising a microprocessor and a program code stored in a memory, the control being electrically with the gripper and the handling unit for controlling the gripper and the handling unit, the control being configured for controlling, by processing of the program code on the microprocessor, the gripper and the handling unit to establish the plug-in connection of the plug to the plug mating element;
- the gripper comprising a plug-in actuator for moving the plug into a plugged-in position with the plug mating element and the control being configured to control the plug-in actuator for moving the plug into the plugged-in position;
- wherein the gripper is coupled to the handling unit by a compensation element, and the compensation element is moveable such that the gripper is movable relative to the handling unit during at least a first operating mode, and
- wherein a compensation unit is configured to switch between the first operating mode in which the compensation unit permits a compensation movement of the gripper with respect to the handling unit and a second operating mode in which the gripper is rigidly coupled to the handling unit.

12. A method for operating a device for automated establishment of a plug-in connection of a plug arranged at a cable to a plug mating element;
wherein
the device includes a gripper connected to a handling unit, said gripper for gripping the plug, and the gripper comprising a plug-in actuator for moving the plug into a plugged-in position with the plug mating element;
wherein the handling unit is a multi-axis robot and comprises a plurality of axes for moving the gripper; and
wherein
the device includes a control comprising a microprocessor and a program code stored in a memory, the control being electrically connected with the gripper and the handling unit for controlling the gripper and the handling unit, the control being configured for controlling, by processing of the program code on the microprocessor, the gripper and the handling unit to establish the plug-in connection of the plug to the plug mating element;
wherein the method comprises the steps of:
controlling, with the control by processing of the program code on the microprocessor, the gripper and the handling unit for the automated establishment of the plug-in connection of the plug with the plug mating element, the controlling comprising:
controlling the gripping element to grip the plug;
controlling the handling unit to move the plug into a position in front of the plug mating element while the gripper is holding the plug in a grip;
controlling the gripper to loosen or release the grip of the gripper; and
controlling the plug-in actuator to move the plug relative to the gripper into the plugged-in position with the plug mating element by the plug-in actuator of the gripper.

13. The method of claim 12, further comprising a step of electrically connecting a battery module, by moving the plug into the plugged-in position for electrically connecting the battery module.

14. The method of claim 12, further comprising a step of electrically connecting a battery module of a hybrid vehicle or an electric vehicle by gripping and moving the plug into the plugged-in position for electrically connecting the battery module.

* * * * *